United States Patent [19]

Bauer et al.

[11] 3,891,781
[45] June 24, 1975

[54] PROCESS FOR THE EXTRACTION OF HOPS

[75] Inventors: Kurt Bauer; Helmut Findeiss; Alfred Krempel, all of Holzminden, Germany

[73] Assignee: Haarmann & Reimer GmbH, Holzminden, Germany

[22] Filed: Sept. 6, 1973

[21] Appl. No.: 394,899

[30] Foreign Application Priority Data
Sept. 8, 1972 Germany............................ 2244065

[52] U.S. Cl................................. 426/429; 426/349
[51] Int. Cl............................................... C12c 9/02
[58] Field of Search ............ 426/425, 429, 431, 349

[56] References Cited
UNITED STATES PATENTS

| | | | |
|---|---|---|---|
| 3,298,835 | 1/1967 | Hildebrand et al.................. | 426/431 |
| 3,364,265 | 1/1968 | Klingel et al....................... | 426/7 X |
| 3,607,298 | 9/1971 | Mitchell et al...................... | 426/429 |

*Primary Examiner*—A. Louis Monacell
*Assistant Examiner*—R. B. Penland
*Attorney, Agent, or Firm*—Burgess, Dinklage & Sprung

[57] ABSTRACT

Process for extracting from hops the essential brewing ingredients thereof, viz., neutral substances, bitter substances and tannin, which process comprises subjecting a primary extract solution of hops, e.g., in alcohol or hydrocarbon solvents, said solution containing as ingredients the neutral substances, bitter substances and tannin, to a first liquid-liquid extraction, wherein either (i) the tannins or (ii) the neutral substances are separated off, leaving a solution of (i) neutral and bitter substances or (ii) tannins and bitter substances, and subjecting the latter solution to a second liquid-liquid extraction to separate said solution into its components; the first extractant is desirably an aliphatic, cycloaliphatic or aromatic hydrocarbon when the primary extract solvent is an alcohol or aqueous-alcoholic solution, to result in extraction of the neutral and bitter substances in a hydrocarbon phase and leaving of the tannin in the alcoholic phase, whereafter the neutral and bitter substances are separated from each other by treating the extract with a second extractant, desirably aliphatic alcohol containing water.

33 Claims, 3 Drawing Figures

PROCESS FOR THE EXTRACTION OF HOPS

This invention relates to a process for extracting hops. Specifically, the present process extracts the neutral substances, bitter substances and tannins from hops as separate fractions.

Processes for producing hop extracts are known (Steiner Hopfen GmbH, Hopfen und Hopfenveredlungsprodukte, Oelde 1907, pages 414 – 421). In the past, however, it has not been possible economically to recover the ingredients present in hops as three separate extracts containing, respectively, the neutral substances, bitter substances and tannins essential for brewing by processes yielding extracts which could safely be used from the physiological point of view.

"Neutral substances" are the group of substances which influence the typical odor and flavor of beer made from hops and which essentially contain the essential oils present in hops. Compounds belonging to this group are essentially terpenes and sesquiterpenes such as, for example, humulene, β-caryophyllene farnesene, mycrene, and also oxy compounds such as, for example, 2-undecanone, geranylacetate, methyldec-4-enoate and methyldeca-4,6-dienoate. Neutral substances also include the group of so-called "unidentified soft resins" whose structure has not yet been clarified (Monatschrift fur Brauerei 22, page 209, (1969)).

"Bitter substances" are the group of substances which provide the characteristically pleasant bitterness of beer and which consist essentially of humulone, cohumulone, adhumulone lupulones, colupulone and adlupolone, and of the oxidative degradation products of these substances.

"Tannins" are the group of substances which consist essentially of tannins, flavonoids and catechins (M. Dadic et al. J. Inst. Brew 76, 267–280 (1970)).

A process for separating from hops the ingredients essential for brewing has not been found, and the instant process yields physiologically acceptable extracts and is not subject to the drawbacks of prior processes.

Essentially, the process of the invention comprises subjecting a hop-extract solution containing neutral substances, bitter substances and tannins, referred to hereinafter as the primary extract solution, to at least two successive liquid-liquid extractions to recover the neutral substances, the bitter substances and the tannins, by separating either (i) the tannins or (ii) the neutral substances from the primary-extract solution in the first extraction stage and subjecting the remaining extract solution of (i) neutral and bitter substances or (ii) tannins and bitter substances left after the first extraction stage to the second extraction stage for separation into its components.

The invention can be described in conjunction with the accompanying drawings, wherein.

Figure 1:
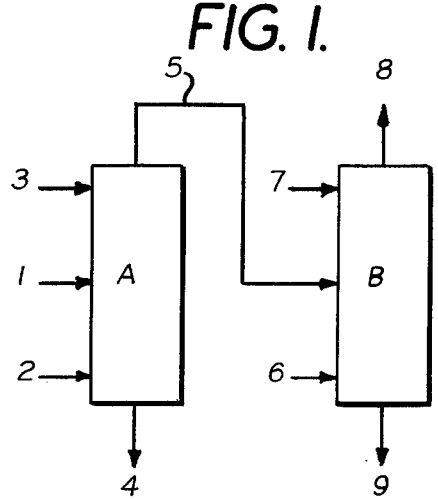
FIG. 1 is a flow chart showing combining extraction stage A and B.

The process according to the invention can be carried out, for example, by subjecting the primary extract solution to two successive liquid-liquid extractions, the neutral and bitter substances being separated off from the tannins in an extraction stage A and the neutral substances and bitter substances being separated from each other in an extraction stage B.

In this case, the extractant 1 used for the extraction stage A is adapted in its polarity to the solvent composition of the primary extract solution in such a way that the bitter substances and neutral substances are almost completely separated from the tannins in the extraction stage A, whilst the extractant 2 used for the extraction stage B is adapted in its polarity to the solvent composition of the solution of bitter and neutral substances left after extraction stage A, in such a way that the neutral substances and the bitter substances are almost completely separated from each other in the extraction stage B.

For the process according to the invention, it has proved to be advantageous for example to use an alcoholic or alcoholic-aqueous solution, preferably a mixture of a lower aliphatic alcohol with water, as the primary extract solution. It has also proved to be advantageous in some cases to use a halogenated hydrocarbon with from 1 to 3 carbon atoms and with up to 3 halogen atoms, preferably chlorine atoms, or benzene or an alkyl benzene with a total of up to 8 carbon atoms, as the solvent in the primary extract solution. It is preferred to use primary extracts containing alcohol or an alcohol-water mixture, methylene chloride or benzene as solvent. Methanol and ethanol or mixtures of these alcohols with water are particularly preferred.

For example, in cases where alcoholic or alcoholic-aqueous primary extract solutions are used, it is possible to employ as extractant 1 for extraction stage A an aliphatic hydrocarbon with from 5 to 10 carbon atoms and/or a cycloaliphatic hydrocarbon with from 5 to 8 carbon atoms and/or an aromatic hydrocarbon such as benzene or an alkyl-substituted benzene derivative, in which case the neutral and bitter substances are extracted into the hydrocarbon phase whilst the tannins remain in the alcoholic-aqueous phase. Thereafter, the extract from extraction stage A is subjected in accordance with the invention to the extraction stage B, for which a mixture of a lower aliphatic alcohol with water, for example, can be used as the extractant 2, the bitter substances being extracted into the alcoholic-aqueous phase and the neutral substances remaining in the hydrocarbon phase.

In this embodiment, the chosen polarity of the hydrocarbons or halogenated hydrocarbon phase is chosen to be sufficiently high in relation to that of the alcoholic-aqueous phase for extraction stage A so that the neutral and bitter substances remain in the hydrocarbon or halogenated hydrocarbon phase, whilst for extraction stage B the polarity is reduced in relation to extraction stage A to such an extent that the bitter substances are extracted from the hydrocarbon or halogenated hydrocarbon phase in extraction stage B.

Instead of using hydrocarbons as extractants for extraction stage A, it is possible to employ halogenated hydrocarbons with 1 to 3 hydrocarbon atoms and up to 3 halogen atoms, preferably methylene chloride or chloroform. The extraction stage A proceeds in exactly analogous manner with a halogenated hydrocarbon extract forming which contains the neutral and bitter substances and which is extracted with mixtures of lower aliphatic alcohols and water, preferably with aqueous methanol, for the purpose of further separation in extraction stage B.

In cases where primary extract solutions in benzene or alkyl benzenes or in halogenated hydrocarbons are used, aliphatic alochols having from 1 to 3 carbon atoms or mixtures thereof with water, preferably methanol or ethanol and, with particular preference, methanol are correspondingly used for extraction stage A, the tannins being extracted into the alcoholic or alcoholic-aqueous phase and the neutral and bitter substances remaining in the hydrocarbon or halogenated hydrocarbon phase. The raffinate containing neutral and bitter substances resulting from extraction stage A is then subjected to the extraction stage B. Stage A is then extracted according to the process of the invention in extraction stage B with mixtures of lower aliphatic alcohols and water; in cases where a halogenated hydrocarbon raffinate is present aqueous methanol is preferably used as an extractant for extraction stage B.

The polarity of the hydrocarbon or halogenated hydrocarbon phase in relation to the alcoholic-aqueous phase may be influenced on the one hand by varying the water content of the alcoholic-aqueous phase and on the other hand by the particular alcohol chosen. For example, the polarity of the alcoholic-aqueous phase increases with increasing water content and when the alcohol varies in the order propanol, ethanol, methanol, and also the polarity is affected by varying the solvent composition of the hydrocarbon phase, for example by varying the cycloaliphatic hydrocarbon content or, in particular, the benzene hydrocarbon content. For example, the polarity of the hydrocarbon phase becomes greater with increasing cycloaliphatic content and, in particular, aromatic hydrocarbon content.

Instead of changing the polarity of the extractant 2 used for the extraction stage B, it is also possible, with the same solvent systems in extraction stages A and B, to reduce the ratio by volume of the extract from extraction stage A to the extractant 2 in relation to the corresponding volume ratio applied in extraction stage A, to such an extent that almost complete separation of the neutral substances and bitter substances is obtained in extraction stage B. In general, it has proved to be particularly advantageous to reduce this volume ratio in extraction stage B to at least about half, preferably to at least one third, of the corresponding value in extraction stage A.

Furthermore, the process according to the invention can be carried out by initially separating the neutral substances from the bitter substances and tannins in the primary extract solution in a first extraction stage C and separating the tannins from the bitter substances in a second extraction stage D.

To this end, the extractant 3 used for the extraction stage C can be adapted in its polarity to the solvent composition of the primary extract in such a way that the neutral substances are almost completely separated from the tannins and bitter substances in the extraction stage C, and furthermore, the extractant 4 used for the subsequent extraction stage D can be adapted in its polarity to the solvent composition of the solution of bitter substances and tannins left after extraction stage C in such a way that almost complete separation of the tannins and bitter substances is obtained in extraction stage D.

For example, it has proved to be advantageous, where an alcoholic-aqueous primary extract solution is used, to employ an aliphatic hydrocarbon having from 5 to 10 carbon atoms and/or a cycloaliphatic hydrocarbon having from 5 to 8 carbon atoms and/or an aromatic hydrocarbon such as benzene or an alkyl-substituted benzene derivative, as extractant 3 for extraction stage C, in which case the neutral substances are extracted into the hydrocarbon phase whilst the bitter substances and tannins remain in the alcoholic-aqueous phase. The alcoholic-aqueous phase left after extraction stage C is then subjected in accordance with the invention to extraction stage D, in which an aliphatic hydrocarbon having from 5 to 10 carbon atoms and/or a cycloaliphatic hydrocarbon having from 5 to 8 carbon atoms and/or an aromatic hydrocarbon such as benzene or an alkyl-substituted benzene derivative can be used as extractant 4, the bitter substances being extracted into the hydrocarbon phase and the tannins remaining in the alcoholic-aqueous phase.

In these embodiments, the polarity of the hydrocarbon or halogenated hydrocarbon phase is chosen to be sufficiently high in relation to that of the alcoholic-aqueous phase for extraction stage C so that only the neutral substances are extracted from the alcoholic-aqueous phase and remain in the hydrocarbon phase in extraction stage C, and furthermore the polarity is increased for extraction stage D to such an extent that the bitter substances are extracted from the alcoholic-aqueous phase in this stage. The polarity of the hydrocarbon or halogenated hydrocarbon phase in relation to the alcoholic-aqueous phase can be controlled in the same way as in extraction stages A and B.

In cases where primary extract solutions in benzene or alkyl benzenes are used, aliphatic alcohols having from 1 to 3 carbon atoms or mixtures thereof with water, preferably methanol or ethanol and, with particular preference, methanol, are used as extractants for extraction stage C in which the bitter substances and tannins are extracted into the alcoholic or alcoholic-aqueous phase whilst the neutral substances remain in the hydrocarbon phase. The raffinate containing tannins and bitter substances from extraction stage C is then subjected to extraction stage D in accordance with the invention.

In the cases wherein primary extract solutions in halogenated hydrocarbons are used, methanol or mixtures of methanol with water are used as extractants for extraction stage C, in which case the bitter substances and tannins are extracted into the alcoholic or alcoholic-aqueous phase whilst the neutral substances remain in the halogenated hydrocarbon phase.

The raffinate containing tannins and bitter substances from extraction stage C is then subjected to extraction stage D is accordance with the invention.

The polarity of the hydrocarbon or halogenated hydrocarbon phase in relation to the alcoholic phase can be influenced in the same way as in the extraction stages A and B.

Instead of changing the polarity of the extractant 4 used for extraction stage D, it is also possible, with the same solvent system in extraction stages C and D, to increase the volume ratio of the extractant 4 to the extract of extraction stage C with respect to the corresponding volume ratio applied in extraction stage C to such an extent that almost complete separation of the bitter substances and tannins is obtained in extraction stage D. In general, it has proved to be particularly advantageous to increase this volume ratio to approximately 5 times and preferably to 20 times the corresponding value in extraction stage C.

The primary extract solution is best prepared by extracting hops with lower aliphatic alcohols, especially with methanol, ethanol, propanol or isopropanol. The primary extract can also be prepared by extracting hops with halogenated hydrocarbons containing from 1 to 3 carbon atoms and up to 3 halogen atoms, preferably chlorine atoms, and also with benzene or alkyl benzenes containing a total of up to 8 carbon atoms. The following are mentioned as examples of halogenated hydrocarbons: methylene chloride, chloroform, 1,1-dichloroethane, 1,2-dichloroethane and 1-chloropropane, preferably methylene chloride, whilst toluene, xylene and ethylbenzene are mentioned as examples of alkyl benzenes. Methanol or ethanol is preferably used as the extractant for preparing the primary extract solution. Extraction is carried out in a conventional manner either by orthodox extraction (cf. Steiner Hopfen GmbH, Hopfen und Hopfenveredlungsprodukte, Oelde 1970, pages 414 – 421) or, for example, in accordance with the carousel extraction principle, (cf. Chemiker Zeitung 94, (1970), pages 56 – 62).

Preparation of the primary extract solution for the process according to the invention can be carried out, for example, with standard commercial dried raw hops as starting material. Hop powder, concentrated hop powder or lupulin, and also water-containing fresh hops, can of course also be processed accordingly as starting materials.

Commercial hop extracts containing neutral substances, bitter substances and tannins can also be separated by the process according to the invention. In this case, the commercial extract is taken up in alcohol, hydrocarbons or halogenated hydrocarbons as solvents before separation in accordance with the invention and the resulting solution is used as the primary extract solution.

The process according to the invention can be carried out in many different ways owing to the large number of possible variations in the solvent systems, in the volume ratios of extractant to the phase to be extracted and in the design of the extractors.

The following are mentioned as examples of the aliphatic hydrocarbons which can be used as extractants 1, 3 and 4: pentane, hexane, heptane, octane, nonane, decane, and the isomers of these compounds. It is, of course, also possible to use mixtures of these compounds, for example a fraction of aliphatic hydrocarbons boiling at a temperature in the range of from about 34° to 40°C (pentane fraction), in the range of from about 65° to 70°C (hexane fraction), in the range of from about 95° to 100°C (heptane fraction), in the range of from about 125° to 130°C (octane fraction), in the range of from about 145° to 155°C (nonane fraction) or in the range of from about 170° to 180°C (decane fraction). It is preferred to use hexane, heptane or octane or the corresponding hexane, heptane or octane fractions.

The following are mentioned as examples of the cycloaliphatic hydrocarbons which can be used as extractants 1, 3 and 4: cyclopentane, cyclohexane, cycloheptane, cyclooctane, and derivatives of these compounds substituted by lower alkyl groups. It is preferred to use cyclopentane and cyclohexane.

Benzene, optionally substituted once or several times by methyl, ethyl, propyl or isopropyl groups, is mentioned as one example of the aromatic hydrocarbons which can be used as extractants 1, 3 and 4. Toluene, ethylbenzene and xylene are mentioned as preferred substituted benzene derivatives.

Methanol, ethanol, propanol and isopropanol are examples of the lower aliphatic alcohols which can be used as extractant 2. It is preferred to use methanol or ethanol.

Methylene chloride is mentioned as one example of the halogenated hydrocarbons which can be used in extractants 1, 3 and 4.

It is preferred to use an alcoholic-aqueous and, with particular preference, a methanolic- or ethanolic-aqueous primary extract solution for extraction stages A and C of the process according to the invention. The water content of this primary extract solution is adjusted to a value of from about 5 to 70% by volume and preferably to from about 5 to 40% by volume and, with particular preference, to from about 5 to 30% by volume.

Extraction stage A is best carried out by extracting the alcoholic-aqueous primary extract solution with an extractant 1 consisting of a mixture of aliphatic hydrocarbons with cycloaliphatic hydrocarbons or with aromatic hydrocarbons. It is preferred to use mixtures comprising aromatic hydrocarbons, benzene, toluene or xylene preferably being used as the aromatic hydrocarbon component.

It has proved to be advantageous, for example for extraction stage A, to adjust the water content of the alcoholic-aqueous phase to between about 10 and 40% by volume, and the aromatic and cycloaliphatic hydrocarbon content of extractant 1 to preferably between about 10 and 60% by volume. For example, where the alcoholic primary extract solution has a water content of about 10% by volume, it is possible to use as extractant 1 a mixture of hydrocarbons, the aromatic hydrocarbon content of which preferably amounts to between about 20 and 60% by volume, and, where it has a water content of approximately 20% by volume, to preferably between about 20 and 40% by volume and, where it has a water content of approximately 30% by volume, to preferably between about 10 to 30% by volume.

In cases where primary extract solutions with benzene or alkyl benzenes or halogenated hydrocarbons as solvents are used, the solutions are extracted accordingly with alcohol or alcohol-water mixtures, preferably methanol or ethanol and, with particular preference, methanol as the extractant, alcohol-water mixtures with a water content of preferably from about 10 to 40% by volume and, with particular preference, from about 20 to 40% by volume, being used.

The ratio by volume of hydrocarbon phase to alcoholic aqueous phase in extraction stage A is variable within wide limits and, for reasons of economy, is in the range of from about 1 to 10. Volume ratios of about 1 to 4 are preferably applied. In cases where primary extract solutions in halogenated hydrocarbons are used, the ratio by volume of halogenated hydrocarbon phase to alcoholic-aqueous phase is generally in the range of from about 0.1 to 2 and preferably in the range of from about 0.2 to 1.5.

To carry out extraction stage B, the hydrocarbon or halogenated hydrocarbon phase resulting from extraction stage A can be delivered to extraction stage B with its solvent composition either intact or modified within the scope of the mixtures used for extraction stage B.

In general, it has proved to be advantageous for extraction in extraction stage B of the process according to the invention, to use a hydrocarbon phase which consists of aliphatic and/or cycloaliphatic and/or aromatic hydrocarbons and which optionally has a cycloaliphatic and/or aromatic hydrocarbon content of less than about 50% by volume, preferably less than about 40% by volume.

Alcohol/water mixtures are generally used as extractant 2, the water content of the extractant preferably amounting to between about 10 and 30% by volume.

It has proved to be particularly advantageous, for example for extraction stage B, to start with a hydrocarbon phase which contains about 0 to 30% by volume of cycloaliphatic and/or aromatic hydrocarbons, and to adjust the water content of extractant 2 to between about 10 and 20% by volume and, with particular preference, to about 10% by volume. For example, it has proved to be advantageous to extract the hydrocarbon phase with an extractant 2 containing approximately 10% by volume of water when it has an aromatic hydrocarbon content of from about 10 to 30% by volume, or with an extractant 2 containing approximately 20% by volume of water when it has an aromatic hydrocarbon content of from 0 to 10% by volume.

The ratio by volume of hydrocarbon phase to extractant 2 is variable within wide limits and, for reasons of economy, generally amounts to between about 0.1 and 1.0. Volume ratios of from about 0.1 to 0.6 are preferred.

In the presence of a halogenated hydrocarbon phase for further extraction in extraction stage B, it has proved to be particularly advantageous to extract the halogenated hydrocarbon phase with aqueous methanol containing from about 30 to 40% by volume of water, and to maintain the ratio by volume of halogenated hydrocarbon phase to alcoholic-aqueous phase preferably within the range of from about 0.05 to 0.2 and, with particular preference, within the range of from about 0.05 to 0.1.

It has been found that, for separation by the process according to the invention, the ratio by volume of hydrocarbon or halogenated hydrocarbon phase to alcoholic-aqueous phase in extraction stage B is best reduced to at least about half and preferably to at least one-third of the corresponding ratio in extraction stage A.

The conditions applied in extraction stage B, especially the water content of the alcoholic-aqueous phase and the aromatic-fraction and cycloaliphatic-fraction content of the hydrocarbon phase, are best adapted to the conditions preselected for extraction stage A so that extraction stages A and B can be combined under the preferred conditions with minimal outlay. Accordingly, the process according to the invention can be advantageously carried out by introducing an alcoholic-aqueous primary extract solution, optionally adjusted to a water content of from about 10 to 30% by volume by the addition of water, into extraction stage A, and using mixtures of an aliphatic hydrocarbon with from 10 to 60% by volume of an aromatic hydrocarbon as extractant 1, extraction being carried out with a ratio by volume of hydrocarbon phase to alcoholic-aqueous phase of about 1 to 10. In the subsequent extraction stage B, the hydrocarbon phase resulting from extraction stage A is extracted with an extractant 2 comprising a lower aliphatic alcohol containing approximately 10 to 30% by volume of water. In extraction stage B, the ratio by volume of hydrocarbon phase of alcoholic-aqueous phase is reduced to at least half and preferably to at least one-third of the corresponding ratio in extraction stage A, and a ratio by volume of about 0.1 to 1 is maintained.

With the same solvent systems in extraction stages A and B, it is only the ratio by volume of hydrocarbon phase to alcoholic-aqueous phase that can be reduced in extraction stage B, and this is preferably reduced to about one-fifth to one-tenth of the corresponding value in extraction stage A. In addition, it has proved to be particularly advantageous in extraction stage B a. either to reduce the water content of extractant 2 by about 10 to 20% by volume in relation to the water content of the alcoholic-aqueous phase from extraction stage A with the same solvent composition of the hydrocarbon phase in extraction stages A and B; or b. where the primary extract solution and extractant 2 have the same water content, to reduce the aromatic and/or cycloaliphatic hydrocarbon content of the hydrocarbon phase to around 5 to 20% by volume by the addition of an aliphatic hydrocarbon containing from 5 to 10 carbon atoms.

Measures (a) and (b) can, of course, also be combined.

Extraction stage C is best carried out by extracting the alcoholic-aqueous primary extract solution with an extractant which consists of the aforementioned aliphatic and/or cycloaliphatic and/or aromatic hydrocarbons.

It has proved to be advantageous, for example in extraction stage C, to adjust the water content of the primary extract solution to about 5 to 30% by volume and preferably to about 10 to 20% by volume, and to use as extractant an aliphatic hydrocarbon or a mixture of an aliphatic hydrocarbon with alicyclic or preferably aromatic hydrocarbons. The cycloaliphatic or aromatic hydrocarbon content of extractant 3 can, for example, amount to between about 0 and 50% by volume, preferably to between about 0 and 30% by volume.

In cases where primary extract solutions in benzene or alkyl benzenes or halogenated hydrocarbons as solvents are used, an alcohol-water mixture is, of course, used accordingly as extractant, methanol or ethanol-water mixtures containing from about 10 to 40% by volume of water preferably being used, particularly preferred are methanol-water mixtures containing from about 20–40% by volume of water.

The ratio by volume of extractant 3 to the alcoholic-aqueous phase is variable within wide limits and, for reasons of economy, is generally in the range of from about 0.1 to 1. It is preferred to apply volume ratios of about 0.2 to 0.6.

To carry out extraction stage D, the alcoholic-aqueous phase emanating from extraction stage C can be delivered to extraction stage D with its water content either intact or modified within the scope of the mixtures used for extraction stage D.

For extraction stage D, it has proved to be advantageous to adjust the water content of the alcoholic-aqueous phase to between about 10 and 40% by volume and preferably to between about 10 and 30% by volume, and to use an extractant 4 containing aliphatic and/or cycloaliphatic and/or aromatic hydrocarbons. For example, where aliphatic hydrocarbons are used as extractant 4, it has proved to be advantageous to adjust the alcoholic-aqueous phase to be extracted to between about 10 and 20% by volume. It is preferred to use mixtures of aliphatic with cycloaliphatic and/or aromatic hydrocarbons, and it is particularly preferred to use mixtures with aromatic hydrocarbons. The aromatic hydrocarbon content of mixtures such as these can generally amount to between about 0 and 90% by volume and preferably amounts to between about 10 and 50% by volume.

The ratio by volume of extractant 4 to the alcoholic aqueous phase is variable within wide limits and, for reasons of economy, it is generally maintained in a range of from about 1 to 10. Volume ratios of about 1 to 4 are preferably applied.

It has been found that, for separation by the process according to the invention, it is best to increase the ratio by volume of the hydrocarbon phase to the alcoholic-aqueous phase in extraction stage D by at least about 5 times and preferably by at least about 20 times the corresponding value in extraction stage C.

To carry out the process according to the invention, therefore, it is advantageous to use in extraction stage C an alcoholic-aqueous primary extract solution, optionally adjusted by the addition of water to a water content of from about 10 to 20% by volume, and to use an aliphatic hydrocarbon, optionally in admixture with an aromatic hydrocarbon, as extractant 3, extraction being carried out with a ratio by volume of hydrocarbon phase to alcoholic-aqueous phase of about 0.1 to 1. In the subsequent extraction stage D, the alcoholic-aqueous phase resulting from extraction stage C is extracted with an extractant 4 comprising a mixture of aliphatic and aromatic hydrocarbons with an aromatic hydrocarbon content of from about 10 to 50% by volume. The ratio by volume of the hydrocarbon phase to the alcoholic-aqueous phase is preferably increased to between at least about 5 times and at least about 20 times the corresponding value in extraction stage C, and a volume ratio of from about 1 to 10 is applied.

With the same solvent systems in extraction stages C and D, only the ratio by volume of hydrocarbon phase to alcoholic-aqueous phase can be increased in extraction stage D, preferably to between about 5 and 10 times the corresponding value in extraction stage C.

Furthermore, it has proved to be particularly advantageous in extraction stage D
a. either to increase the aromatic hydrocarbon content of the hydrocarbon phase used as extractant 4 by about 10 to 20% by volume where the water content of the alcoholic-aqueous phase in extraction stages C and D is the same, or
b. where the hydrocarbon phase of extraction stages C and D has the same solvent composition, to increase the water content of the alcoholic- aqueous phase by about 5 to 20% by volume in relation to the water content of the aqueous- alcoholic phase from extraction stage C.

Measures (a) and (b) can, of course, also be combined.

In the process according to the invention, the liquid-liquid extractions are carried out by conventional extraction methods. Thus, the individual extraction stages can be carried out, for example, by shaking in separation funnels, by means of mixer-settler systems, and also by countercurrent extraction in columns without stirrers such as, for example, extraction spray towers or extraction towers with or without a packing, or by countercurrent extraction in columns with stirrers such as, for example, Scheibel columns or RDC (rotating disc contactor) columns or by means of extraction centrifuges. Sieve-plate pulsation columns and RDC columns have proved to be particularly advantageous for continuous operation.

The extraction temperature for the individual extraction stages is variable within wide limits. For practical reasons, extraction is generally carried out at temperatures of from 0° to 50°C and preferably at temperatures of from 5° to 30°C. For practical and economical reasons, the extractions are normally carried out under normal pressure, although, in principle, they could also be carried out under excess pressure, for example in cases where particularly low-boiling extractants are used.

The neutral substances, bitter substances and tannins from the alcoholic-aqueous solutions or hydrocarbon solutions or halogenated hydrocarbon solutions obtained by the process according to the invention can be separated from the solvent in the usual way, for example in a rotary evaporator, falling-film evaporator or thin-layer evaporator.

One embodiment of the process according to the invention, in which countercurrent extraction columns are used for combining extraction stages A and B, is explained with reference to the flow chart in FIG. 1. The primary extract solution is introduced into extraction column A through pipe 1. Extraction stage A is carried out in column A, the extractant 1 being delivered in countercurrent to column A through pipe 2 (hydrocarbon phase) while an alcoholic-aqueous solvent mixture, which corresponds to the solvent composition of the primary extract solution, is delivered to the head of column A through pipe 3. The tannins remain in the alcoholic-aqueous phase and are removed from the bottom of column A through pipe 4. The bitter substances and neutral substances enter the extract and are removed at the head of column A through pipe 5 and delivered to column B.

Extraction stage B is carried out in column B, the extractant 2 (a mixture of alcohol and water) being delivered through pipe 7. A hydrocarbon or hydrocarbon mixture, which corresponds to the solvent composition of the hydrocarbon phase to be extracted, is delivered through pipe 6.

The bitter substances are removed in alcoholic-aqueous solution from column B through pipe 9. The neutral substances remain in the hydrocarbon phase and are removed from column B through pipe 8.

Figure 2:
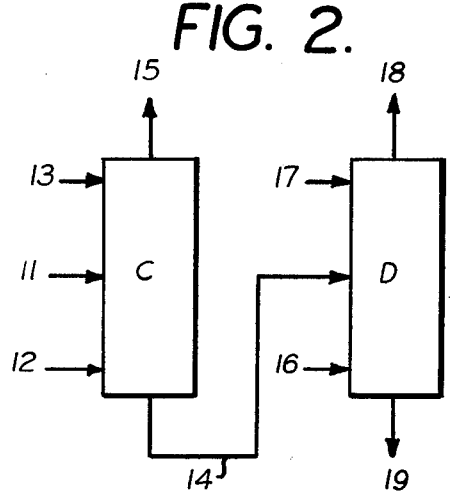
FIG. 2 is a flow chart showing combining extraction stages C and D.

Another embodiment of the process according to the invention for combining extraction stages C and D is explained with reference to the flow chart in FIG. 2:

The alcoholic-aqueous primary extract solution is introduced into the extraction column C through pipe 11. Extraction stage C is carried out in column C, the extractant 3 being delivered in countercurrent to the bottom of column C through pipe 12 (hydrocarbon phase), whilst a solvent mixture, corresponding to the solvent composition of the primary extract solution, is delivered to the head of column C through pipe 13.

The bitter substances and tannins remain in the alcoholic-aqueous phase and are removed from column C through pipe 14. The neutral substances enter the extract and are removed at the head of column C through pipe 15 and delivered to column D.

Extraction stage D is carried out in column D, the extractant 4 (hydrocarbon mixture) being delivered through pipe 16. An alcoholic-water mixture, which corresponds to the solvent composition of the alcoholic-aqueous phase to be extracted, is delivered through pipe 17.

The bitter substances are extracted in the hydrocarbon phase and are removed from column D through pipe 18. The tannins are removed in alcoholic-aqueous solution from column D through pipe 19.

The extracts obtained by the process according to the invention can be used for the production of beer. The extracts can be used, for example, in the form of the alcoholic solutions obtained from the individual extraction stages or preferably following evaporation of the solvent. The extracts obtained by the process according to the invention are advantageous in that the individual extracts which, in their entirety, contain all the ingredients essential for brewing, can be used in a precisely defined quantity and in different phases of the brewing process involved in the production of beer. Accordingly, the ingredients can be prevented from being adversely affected in terms of their effect during the brewing process. For example, the hops can be aromatized with full utilization of the bitter substances by separately adding the extracts of bitter and neutral substances.

Another advantage of the process according to the invention is that, in contrast to other separation processes such as, for example, steam distillation or precipitation, the separation process according to the invention is extremely gentle on the products themselves insofar as it is not carried out either at elevated temperature or in the presence of salts, acids or alkalis, so that the ingredients of the hops, some of which are extremely sensitive, undergo no changes. Furthermore, no substances that are foreign to hops enter the extracts in the process according to the invention, with the result that the extracts can be used safely in physiological terms for the production of beer.

It must be regarded as extremely surprising that the hop ingredients, which represent a complex mixture of a variety of different types of compounds, can be separated by the process according to the invention, i.e. by a succession of extractions, into the three characteristic groups of neutral substances, bitter substances and tannins.

The process according to the invention constitutes a considerable technical advance by allowing completely new techniques to be applied to the production of beer. A large number of possible variations is created by the periodically and quantitatively reproducible addition of the three extracts during the brewing process.

EXAMPLE 1

35 kg of hops of the "Hallertauer Mittelfruher 1970" type, which were in the form of standard pressed hops and which, before processing, had been stored for a total of 3 months, were extracted with 80 kg of methanol to prepare a primary extract solution. For this purpose, the hops were size-reduced, introduced into four cylinder extraction columns in four 8.75 kg batches and percolated with the solvent.

Percolation was carried out in such a way that the entire solvent was introduced into the first column and the solution trickling down was collected successively in 10 equal parts by volume. After the entire quantity of solvent had been added, more solvent was additionally introduced into the column in a quantity commensurate with that retained by the hops as absorbed solution, so that the volume of the solution flowing out of the bottom of the column was equal to the volume of the total solvent added at the head of the column. The 10 equal parts by volume thus obtained, beginning with the first, were successively introduced into the next column. After all 10 of the component quantities from the first column had been added to the second column, additional solvent was again introduced into the second column in a quantity commensurate with that retained by the hops in the form of absorbed solution, with the result that the volume of the solution flowing out of the bottom of the column was equal to the volume of the solution added at the head of the column. The same procedure was adopted for the remaining columns.

112.2 liters of primary extract solution weighing 93.7 kg and containing 9.65 kg of hop extract, corresponding to 10.2% by weight, and 4.05 kg of water, corresponding to 4.32% by weight, were obtained from the fourth column. 9.65 kg of hop extract corresponded to an extraction yield of 27.6% (based on the hops used). 5.64 (58.5%) of this extract were soluble in n-hexane. This n-hexane-soluble fraction contained the bitter and neutral substances 4.01 kg (41.5%) were insoluble in n-hexane. This fraction insoluble in n-hexane contained the tannins.

EXAMPLE 2

50 kg of the hops of the "Tettnanger 1971" type, which were in the form of non-pressed baled hops and which had been stored for a total of 5 months before processing, were extracted with 61.28 kg of methanol to prepare a primary extract solution. For this purpose, the hops were size-reduced, introduced into six cylindrical extraction columns in six 8.33 kg batches and percolated with the solvent as in Example 1.

92.68 liters of primary extract solution weighing 78.75 kg and containing 12.05 kg of hop extracts, corresponding to 15.3% by weight, and 3.75 kg of water, corresponding to 4.76% by weight, were obtained from the sixth column. The 12.05 kg of hop extract corresponded to an extraction yield of 24.1% and contained 6.09 kg (50.5%) of neutral and bitter substances and 5.96 kg (49.5%) of tannins.

EXAMPLE 3

65 kg of the hops of the "Hallertauer Nordbrauer 1970" type which were in the form of standard pressed hops and which had been stored for a total of 11 months before processing, where extracted with 63.0 kg of methanol to prepare a primary extract solution. For this purpose, the hope were size-reduced, introduced into eight cylindrical extraction columns in eight 8.13 kg batches and percolated with the solvent as in Example 1.

98.02 liters of primary extract solution weighing 85.8 kg and containing 16.0 kg of hop extract, corresponding to 18.75% by weight, and 7.22 kg of water, corresponding to 8.42% by weight, were obtained from the eighth column. The 16.08 kg of hop extract corresponded to an extraction yield of 24.75% and contained 9.25 kg (57.5%) of neutral and bitter substances and 6.834 kg (42.5%) of tannins.

EXAMPLE 4

45 kg of hops of the "Spolter 1968" type, which were in the form of standard pressed hops and which had been stored for a total of 18 months before processing, were extracted with 69.5 kg of methanol to prepare a primary extract solution. For this purpose, the hops were size-reduced, introduced into six cylindrical extraction columns in six 7.5 kg batches and percolated with the solvent as in Example 1.

99.95 liters of primary extract solution weighing 84.92 kg and containing 10.62 kg of hop extract, corresponding to 12.51% by weight, and 4.80 kg of water, corresponding to 6.46% by weight, were obtained from the sixth column. The 10.62 kg of hop extract corresponded to an extraction yield of 23.6% and contained 3.95 kg (37.2%) of neutral and bitter substances and 6.67 kg (62.8%) of tannins.

EXAMPLE 5

50 kg of hops of the "Hallertauer Mittelfruher 1970" type, which were in the form of standard pressed hops and which had been stored for a total of 8 months before processing, where extracted with 68.0 kg of methanol to prepare a primary extract solution. For this purpose, the hops were size-reduced, introduced into six cylindrical extraction columns in six 8.33 kg batches and percolated with the solvent as in Example 1.

99.80 liters of primary extract solution weighing 84.84 kg and containing 12.05 kg of hop extract, corresponding to 14.18% by weight, and 4.89 kg of water, corresponding to 5.76% by weight, were obtained from the sixth column. The 12.05 kg of hop extract corresponded to an extraction yield of 24.2% and contained 6.14 kg (51.0%) of neutral and bitter substances and 5.91 kg (49.0%) of tannins.

EXAMPLE 6

50 kg of hops of the "Tettnanger 1968" type, which were in the form of non-pressed baled hops and which had been stored for a total of 2 months before processing, were extracted with 75.0 kg of ethanol to prepare a primary extract solution. For this purpose, the hops were size-reduced, introduced into six cylindrical extraction columns in six 8.33 kg batches and percolated with the solvent as in Example 1.

110.3 liters of primary extract solution weighing 92.28 kg and containing 11.25 kg of hop extract, which corresponds to 5.45% by weight, were obtained from the sixth column. The 11.25 kg of hop extract corresponded to an extraction yield of 22.5% and contained 6.83 kg (60.7%) of neutral and bitter substances and 4.42 kg (39,3%) of tannins.

EXAMPLE 7

50 kg of hops of the "Nordbrauer 1970" type, which were in the form of standard pressed hops and which had been stored for a total of 1.5 months before processing, were extracted with 82.5 kg of n-propanol to prepare a primary extract solution. For this purpose, the hops were size-reduced, introduced into seven cylindrical extraction columns in seven 7.15 kg batches and percolated with the solvent as in Example 1.

117.1 liters of primary extract solution weighing 98.63 kg and containing 10.90 kg of hop extract, corresponding to 11.05% by weight, and 5.73 kg of water, corresponding to 5.81% by weight, were obtained from the seventh column. The 10.90 kg of hop extract corresponded to an extraction yield of 21.8% and contained 7.44 kg (68.2%) of neutral and bitter substances and 3.46 kg (31.8%) of tannins.

EXAMPLE 8

50 kg of hops of the "Hallertauer Mittelfruher 1971" type, which were in the form of standard pressed hops and which had been stored for a total of 4 months before processing, were extracted with 71.5 kg of i-propanol to prepare a primary extract solution. For this purpose, the hops were size-reduced, introduced into seven cylindrical columns in seven 7.15 kg batches and percolated with the solvent as in Example 1.

104.74 liters of primary extract solution weighing 87.02 kg and containing 9.92 kg of hop extract, corresponding to 11.4% by weight, and 5.6 kg of water, corresponding to 6.94% by weight, were obtained from the seventh column. The 9.92 kg of hop extract corresponded to an extraction yield of 19.83% and contained 6.289 kg (63.4%) of neutral and bitter substances and 3.630 kg (36.6%) of tannins.

EXAMPLE 8a 20 kg of hops of the "Hallertauer Mittelfruher 1972" type, which were in the form of conventional pressed hops and which had been stored for a total of 6 months before processing, were extracted with 33.755 kg of methanol to prepare a primary extract solution. For this purpose the hops were sizereduced, introduced into six cylindrical extraction columns in six 3.333 kg batches and percolated with the solvent as in Example 1.

48.408 liters of primary extract solution weighing 40.905 kg and containing 5.064 kg of hop extract, corresponding to 12.38% by weight, and 2.086 kg of water, corresponding to 5.10% by weight, were obtained from the sixth column. The 5.064 kg of hop extract corresponded to an extraction yield of 25.32% and contained 2.719 kg (53.7%) of neutral and bitter substances and 2.345 kg (46.3%) of tannins.

EXAMPLE 8b 20 kg of hops of the "Hallertauer Nordbrauer 1972" type, which were present in the form of standard pressed hops and which had been stored for a total of 6 months before processing, were extracted with 35.827 kg of methanol to prepare a primary extract solution. For this purpose, the hops were sized-reduced, introduced into six cylindrical extraction columns in six 3.333 kg batches and percolated with the solvent as in Example 1.

51.410 liters of primary extract solution weighing 43.441 kg and containing 5.226 kg of hop extract, corresponding to 12.03% by weight, and 2.388 kg of water, corresponding to 5.50% by weight, were obtained from the sixth column. The 5.226 kg of hop extract corresponded to an extraction yield of 26.13% and contained 3.465 kg (66.3%) of neutral and bitter substances and 1.761 kg (33.7%) of tannins.

EXAMPLE 8c 23 kg of hops of the "Hallertauer Mittelfruher 1971" type, which were present in the form of standard pressed hops and which had been stored for a total of 3 months before processing, were extracted with 36.293 kg of ethanol to prepare a primary extract solution. For this purpose, the hops were size-reduced, introduced into eight cylindrical extraction columns in eight 2.875 kg batches and percolated with the solvent as in Example 1.

EXAMPLE 8d 35 kg of hops of the "Hallertauer Mittelfruher 1972" type, which were present in the form of standard pressed hops and which had been stored for a total of 6 months before processing, were extracted with 71.776 kg of methylene chloride to prepare a primary extract solution. For this purpose, the hops were size-reduced, introduced into seven cylindrical extraction columns in seven 5 kg batches and percolated with the solvent as in Example 1.

58.553 liters of primary extract solution weighing 76.997 kg and containing 5.128 kg of hop extract, corresponding to 6.66% by weight, and 0.093 kg of water, corresponding to 0.12% by weight were obtained from the seventh column. The 5.128 kg of hop extract corresponded to an extraction yield of 14.65% and contained 4.972 kg (96.96%) of neutral and bitter substances and 0.156 kg (3.04%) of tannins.

EXAMPLE 8e 40 kg of hops of the "Hallertauer Nordbrauer 1972" type, which were in the form of standard pressed hops and which had been stored for a total of 6 months before processing, were extracted with 51.737 kg of benzene to prepare a primary extract solution. For this purpose, the hops were size-reduced, introduced into five cylindrical extraction columns in five 8 kg batches and percolated with the solvent as in Example 1.

63.832 liters of primary extract solution weighing 57.449 kg and containing 5.676 kg of hop extract, corresponding to 9.88% by weight, and 0.036 kg of water, corresponding to 0.06% by weight, were obtained from the fifth column. The 5.676 kg of hop extract corresponded to an extraction yield of 14.19% and contained 5.103 kg (89.90%) of neutral and bitter substances and 0.573 kg (10.10%) of tannins.

EXAMPLES 9 to 110

Separation of the hop constituents in the separation stages A, B, C and D is described in tabular form in the following Examples 9 to 110.

The details of the individual Examples relate to a succession of extractions in a separation funnel. The results of these Examples can also be applied to any other batch-type distributing apparatus or can form the basis for the design of continuous-type extraction columns.

Figure 3:
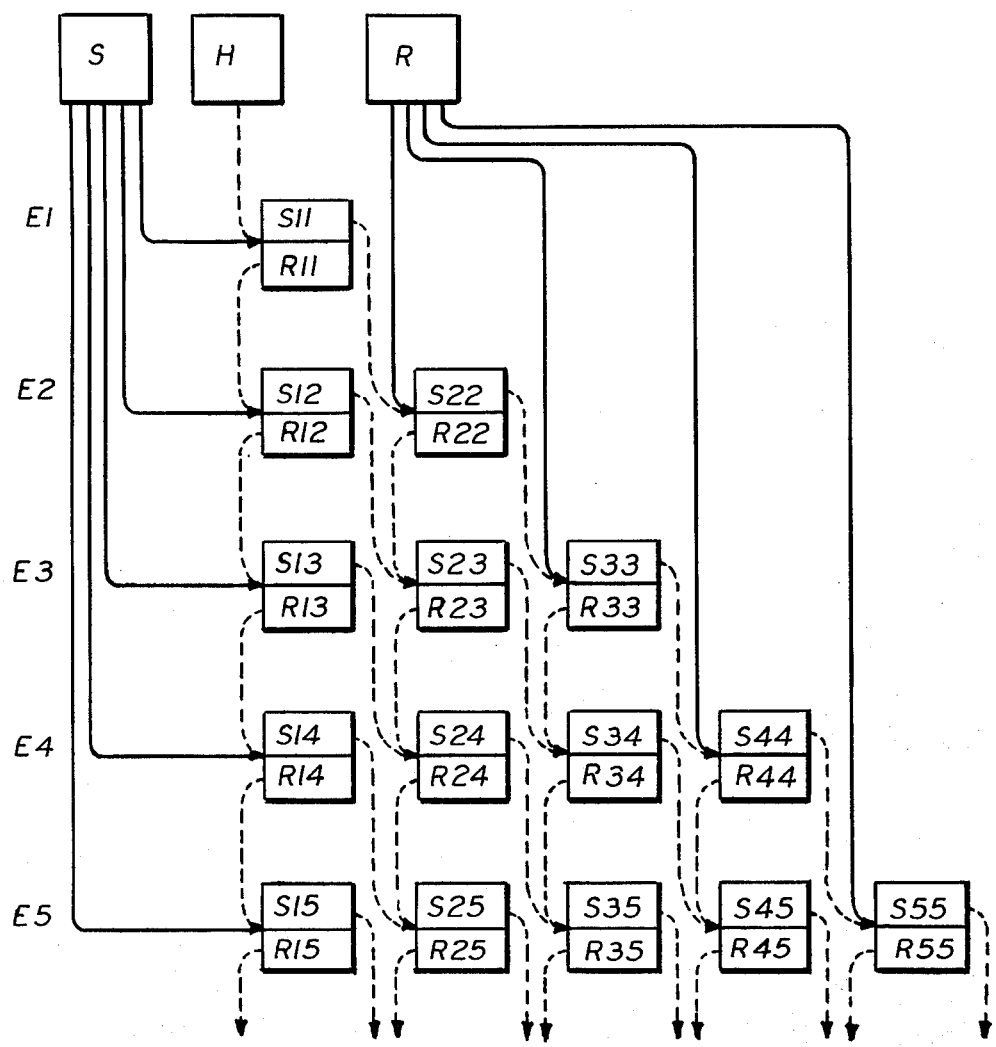
FIG. 3 is a flow diagram of a typical extraction sequence.

The extractions on which the individual Examples are based were carried out in accordance with the flow chart illustrated in FIG. 3.

In FIG. 3, S represents the extractant (solvent), H the solution to be extracted, and R a solvent mixture which corresponds in solvent composition to the solution to be extracted.

According to the flow chart, the phase H to be extracted is extracted with the extractant S in the extraction stage E1. The resulting phases $S_{11}$ (solvent phase obtained during extraction) and $R_{11}$ (raffinate phase obtained during extraction) were each subjected to another extraction in the extraction stage E2.

In extraction stage E2, the phase $R_{11}$ was extracted with fresh extractant S and the phase $S_{11}$ with fresh solvent R which corresponded to the solution to be extracted. The solvent phases $S_{12}$ and $S_{22}$ formed and the raffinate phases $R_{12}$ and $R_{22}$ were subjected to further extractions in the extraction stage E3, as indicated by the arrows. $R_{12}$ was extracted with solvent S, $S_{22}$ with fresh R and $R_{22}$ with $S_{12}$. The resulting phases $S_{13}$, $S_{23}$ and $S_{33}$, and $R_{13}$, $R_{23}$ and $R_{33}$ could be delivered to a different extraction stage E4, in accordance with the flow chart, and similarly to the further extraction stages E5, E6, etc.

Tables 1 to 8 contain the following particulars with reference to Examples 9 to 110:

The column headed "Primary Extract Solution Used" (Tables 1, 2, 2a, 5, 6, 6a) sets forth the origin of the extract solution by reference to the preceding Examples in which the same solution was obtained i.e., the solutions used have the same ingredients as the solvent system used in the particular preceding Example identified in the column. (With respect to the column headed "Solution Used" cf. footnote 3 and 4).

In cases where primary extract solutions of Example 1 to 8 are used (i.e., in Tables 1, 2, 2a, 5, 6 and 6a), the primary extract solution referred to is adjusted to the water content specified in the column headed "Alcoholic Phase" and used in the quantity specified in the latter column. For instance, the primary extract solution used in Example 9 (relating to separation stage C) was the same as prepared in Example 1 (utilizing methanol as the solvent) and the solvent used in Example 9 was adjusted to one liter with the water content of 10% (i.e. of 90% (aqueous) methanol, as stated in Example 9).

In those cases where Examples 9 to 110 are referred to in the "Solution Used" column (i.e., in Tables 3, 4, 4a, 7, 8 and 8a), the ingredients of the raffinate or solvent phase are freed from the solvent if necessary by concentration through evaporation (for example at 40°C/10 to 100 mm Hg in a rotary evaporator), and are subsequently dissolved in the quantity of solvent specified (also see footnotes 3 and 4 below). For instance, in Example 31 (relating to Separation Stage D), the Solution Used was a solution of the ingredients of the raffinate phase of Example 9 dissolved in 0.7 liters of 90% (by vol.) aqueous methanol, i.e., the solvent stated in the column "Alcoholic Phase" in Example 31.

The column headed "Solvent System" shows the solvents and quantities of solvent used for extraction. The quantities of solvent specified in the column headed "Quantity in 1." relate in each case to one extraction stage (E1, E2, etc.).

The results are expressed in terms of the content, in the recovered solvent and raffinate phases, of neutral substances N, bitter substances B and tannins G, the solvent phases $S_{xz}$ and raffinate phases $R_{yz}$, which were selected for determining the content of ingredients and on which the values are based, being derived from the drawings showing z, x and y. (The remaining fractions were discarded).

The footnotes which apply for the following Tables are located after the last Table in this series, viz., Table 8a, below.

Table 1

Separation Stage C
Separation of the neutral substances from the bitter substances and tannins

| Ex. No. | Primary Extract Solution Used (Ex.No.) | Solvent System Hydrocarbon phase Composition (parts by volume) | Quantity in l. | Solvent System Alcoholic phase Composition (mixture with water) | Quantity in l. | No. of extraction stages[1] z = | Solvent phase recovered[2] HC*—solution content of x = | NS BS T | Raffinate phase recovered[2] Alcoholic-aqueous solution content of y = | NS BS T |
|---|---|---|---|---|---|---|---|---|---|---|
| 9 | 1 | pentane fraction | 0.44 | 90% by vol. methanol | 1 | 9 | 5–9 | N= 5.23g =96.2%<br>B= 0.21g = 3.8%<br>T= 0 g = 0 % | 1–5 | N= 0.04g = 0.0%<br>B= 33.43g =50.0%<br>T= 33.33g =49.9% |
| 10 | 2 | hexane fraction | 3.50 | 90% by vol. methanol | 5 | 11 | 6–11 | N=34.21g =94.6%<br>B= 1.93g = 5.3%<br>T= 0.02g = 0.1% | 1–6 | N= 0.31g = 0.1%<br>B=211.88g =43.0%<br>T=280.27g =56.9% |
| 11 | 6 | hexane fraction | 2.75 | 90% by vol. ethanol | 5 | 11 | 6–11 | N=34.75g =95.8%<br>B= 1.51g = 4.2%<br>T= 0g = 0% | 1–6 | N= 0.49g =<0.1%<br>B=203.99g =52.1%<br>T=187.36g =47.9% |
| 12 | 6 | heptane fraction | 1.16 | 89.5% by vol. ethanol | 1 | 26 | 14–26 | N= 5.95g =95.4%<br>B= 0.29g = 4.6%<br>T= 0.01g =<0.1% | 1–13 | N= 0.04g =<0.1%<br>B= 34.g =48.0%<br>T= 36.91g =52.0% |
| 13 | 1 | octane fraction | 0.46 | 80% by vol. methanol | 1 | 11 | 6–11 | N= 4.71g =95.6%<br>B= 0.21g = 4.4%<br>T= 0g = 0% | 1–6 | N= 0.03g = 0.1%<br>B= 29.84g =49.5%<br>T= 30.41g =50.4% |
| 14 | 6 | octane fraction | 0.91 | 90% by vol. ethanol | 1 | 14 | 8–14 | N= 6.64g =97.4%<br>B= 0.18g = 2.6%<br>T= 0g = 0% | 1–7 | N= 0.02g =<0.1%<br>B= 37.59g =51.2%<br>T= 35.85g =48.8% |
| 15 | 2 | decane fraction | 0.60 | 90% by vol. methanol | 1 | 26 | 14–26 | N= 6.22g =99.1%<br>B= 0.05g = 0.9%<br>T= 0g = 0% | 1–13 | N= 0.02g =<0.1%<br>B= 43.78g =42.7%<br>T= 58.82g =57.3% |
| 16 | 6 | decane fraction | 1.16 | 90% by vol. ethanol | 1 | 26 | 14–26 | N= 6.23g =97.9%<br>B= 0.13g = 2.1%<br>T= 0g = 0% | 1–12 | N= 0.01g =<0.1%<br>B= 35.57g =50.0%<br>T= 35.50g =30.0% |
| 17 | 7 | decane fraction | 1.35 | 80% by vol. n-propanol | 1 | 16 | 9–16 | N= 5.76g =97.2%<br>B= 0.17g = 2.8%<br>T= 0g = 0% | 1–8 | N= 0.02g =<0.1%<br>B= 34.38g =59.8%<br>T= 23.10g =40.2% |
| 18 | 2 | cyclohexane | 1.04 | 85% by vol. methanol | 1 | 31 | 15–31 | N= 5.15g =70.2%<br>B= 2.18g =29.8%<br>T= 0g = 0% | 1–17 | N= 0.40g = 0.4%<br>B= 31.70g =36.0%<br>T= 56.9g =63.6% |

Table 2

Separation Stage C
Separation of the neutral substances from the bitter substances and tannins

| Ex. No. | Primary Extract Solution Used (Ex.No.) | Solvent System Hydrocarbon phase Composition (parts by volume) | Quantity in l. | Solvent System Alcoholic phase Composition (mixture with water) | Quantity in l. | No. of extraction stages[1] z = | Solvent phase recovered[2] HC*—solution content of x = | NS BS T | Raffinate phase recovered[2] Alcoholic-aqueous solution content of y = | NS BS T |
|---|---|---|---|---|---|---|---|---|---|---|
| 19 | 1 | cyclohexane | 0.34 | 70% by vol. methanol | 2 | 26 | 15–26 | N= 7.40g =99.5%<br>B= 0.04g = 0.5%<br>T= 0 g = 0 % | 1–12 | N= 0.01g =<0.1%<br>B= 46.93g =47.0%<br>T= 52.98g =53.0% |
| 20 | 1 | hexane fraction benzene (10:1) | 1.44 | 90% by vol. methanol | 2 | 16 | 9–16 | N= 9.47g =96.9%<br>B= 0.30g = 3.1%<br>T= 0 g = 0 % | 1–8 | N= 0.05g =<0.1%<br>B= 59.95g =47.5%<br>T= 66.28g =52.5% |
| 21 | 2 | hexane fraction benzene (10:1) | 0.28 | 80% by vol. methanol | 1 | 26 | 15–26 | N= 5.56g =99.6%<br>B= 0.02g = 0.4%<br>T= 0 g = 0 % | 1–12 | N= 0.01g =<0.1%<br>B= 34.00g =38.7%<br>T= 53.77g =61.3% |
| 22 | 3 | hexane fraction benzene (7:3) | 0.22 | 80% by vol. methanol | 1 | 26 | 14–26 | N= 8.61g =97.4%<br>B= 0.23g = 2.6%<br>T= 0 g = 0 % | 1–13 | N= 0.04g =<0.1%<br>B= 49.64g =45.4%<br>T= 59.62g =54.6% |
| 23 | 6 | hexane fraction benzene (10:1) | 0.5 | 80% by vol. ethanol | 1 | 26 | 14–26 | N= 5.37g =95.3%<br>B= 0.26g = 4.7%<br>B= 0 g = 0 % | 1–13 | N= 0.04g = 0.1%<br>B= 30.7 g =47.8%<br>T= 33.54g =52.1% |

Table 2 —Continued

Separation Stage C
Separation of the neutral substances from the bitter substances and tannins

| Ex. No. | Primary Extract Solution Used (Ex.No.) | Solvent System Hydrocarbon phase Composition (parts by volume) | Quantity in l. | Solvent System Alcoholic phase Composition (mixture with water) | Quantity in l. | No. of extraction stages[1] z = | Solvent phase recovered[2] x = | HC*—solution content of NS BS T | Raffinate phase recovered[2] y = | Alcoholic-aqueous solution content of NS BS T |
|---|---|---|---|---|---|---|---|---|---|---|
| 24 | 5 | hexane fraction toluene (6:4) | 0.24 | 90% by vol. methanol | 1 | 11 | 6–11 | N= 5.62g =93.8%<br>B= 0.37g = 6.2%<br>T= 0    g = 0 % | 1–6 | N= 0.05g = 0.1%<br>B= 40.74g =42.4%<br>T= 57.5 g =57.5% |
| 25 | 3 | hexane fraction cyclohexane (7:3) | 0.26 | 80% by vol. methanol | 1 | 13 | 7–13 | N= 9.57g =96.1%<br>B= 0.39g = 3.9%<br>T= 0    g = 0 % | 1–7 | N= 0.07g = 0.1%<br>B= 54.67g =47.7%<br>T= 59.87g =52.2% |
| 26 | 6 | hexane fraction cyclohexane (10:1) | 0.55 | 80% by vol. ethanol | 1 | 26 | 15–26 | N= 5.62g =99.6%<br>B= 0.02g = 0.4%<br>T= 0    g = 0 % | 1–12 | N= 0.01g =<0.1%<br>B= 32.29g =48.9%<br>T= 33.71g =51.1% |
| 27 | 2 | heptane fraction benzene (15:1) | 3.44 | 93.2% by vol. methanol | 4 | 16 | 9–16 | N=26.43g =97.6%<br>B= 0.66g = 2.4%<br>T= 0    g = 0 % | 1–8 | N= 0.12g =<0.1%<br>B=164.01g =40.5%<br>T=241.12g =59.5% |
| 28 | 6 | heptane fraction benzene (10:3) | 1.82 | 90% by vol. ethanol | 2 | 26 | 13–26 | N=11.83g =85.8%<br>B= 1.96g =14.2%<br>T= 0    g = 0 % | 1–14 | N= 0.30g = 0.2%<br>B= 67.89g =47.9%<br>T= 73.67g =51.9% |
| 29 | 1 | octane fraction xylene (6:4) | 0.5 | 80% by vol. ethanol | 1 | 15 | 8–15 | N= 5.95g =96.0%<br>B= 0.25g = 4.0%<br>T= 0    g = 0 % | 1–8 | N= 0.04g = 0.1%<br>B= 34.20g =51.9%<br>T= 31.60g =48.0% |
| 30 | 3 | decane fraction benzene | 0.51 | 90% by vol. methanol | 1 | 26 | 14–20 | N= 9.51g =36.9%<br>B= 0.30g = 3.1%<br>T= 0    g = 0 % | 1–13 | N= 0.05g = 0.1%<br>B= 54.69g =45.2%<br>T= 66.36g =54.7% |

Table 2a

Separation Stage C
Separation of the neutral substances from the bitter substances and tannins

| Ex. No. | Primary Extract Solution Used (Ex.No.) | Solvent System Hydrocarbon phase Composition (parts by volume) | Quantity in l. | Solvent System Alcoholic phase Composition (mixture with water) | Quantity in l. | No. of extraction stages[1] z = | Solvent phase recovered[2] x = | HC*—solution content of NS BS T | Raffinate phase recovered[2] y = | Alcoholic-aqueous solution content of NS BS T |
|---|---|---|---|---|---|---|---|---|---|---|
| 30a | 3 | cyclooctane | 0.425 | 90% by vol. methanol | 0.500 | 35 | 20–35 | N= 4.67g =99.7%<br>B= 0.01g = 0.03%<br>T= 0.00g = 0.0% | 1–16 | N= 0.00g = 0.0%<br>B=26.92g = 45.0<br>T=32.88g =55.0% |
| 30b | 2 | octane fraction cyclohexane (7:3) | 0.170 | 80% by vol. methanol | 0.500 | 16 | 9–16 | N= 2.94g =98.1%<br>B= 0.06g = 1.9%<br>T= 0.00g = 0.0% | 1–8 | N= 0.01g = 0.1%<br>B=18.25g =40.3%<br>T=27.07g =59.7% |
| 30c | 8b | hexane xylene (6:4) | 0.196 | 90% by vol. methanol | 1.000 | 8 | 5–8 | N= 5.20g =98.8%<br>B= 0.06g = 1.2%<br>T= 0.00g = 0.0% | 1–4 | N= 0.01g =<0.1%<br>B=49.46g =60.7%<br>T=32.09g =39.37% |
| 30d | 1 | benzene | 0.045 | 70% by vol. methanol | 0.500 | 50 | 28–50 | N= 3.43g =99.9%<br>B=<0.01g = 0.1%<br>T= 0.00g = 0.0% | 1–23 | N= 0.00g = 0.0%<br>B=21.34g =37.6%<br>T=35.48g =62.4% |
| 30e | 8b | benzene | 0.068 | 70% by vol. methanol | 0.750 | 50 | 28–50 | N= 3.43g =99.7%<br>B= 0.01g = 0.8%<br>T= 0.00g = 0.0% | 1–23 | N= 0.00g = 0.0%<br>B=21.34g =37.6%<br>T=35.48g =62.4% |
| 30f | 2 | benzene | 0.070 | 40% by vol. methanol | 1.000 | 60 | 32–60 | N= 4.26g =97.8%<br>B= 0.10g = 2.2%<br>T= 0.00g = 0.0% | 1–29 | N= 0.02g = 0.1%<br>3=26.45g =35.8%<br>T=47.34g =64.1% |
| 30g | 6 | benzene | 0.090 | 70% by vol. ethanol | 1.000 | 65 | 34–65 | N= 4.24g =96.1%<br>B= 0.17g = 3.9%<br>T= 0.00g = 0.0% | 1–32 | N= 0.03g =<0.1%<br>B=24.33g =45.3%<br>T=29.39g =54.7% |
| 30f | 8e | benzene | 0.043 | 70% by vol. methanol | 0.500 | 50 | 28–50 | N= 5.59g =99.9%<br>B= 0.01g = 0.1%<br>T= 0.00g = 0.0% | 1–23 | N= 0.01g = 0.1%<br>B=21.33g =82.9%<br>T= 4.41g =17.1% |

Table 3

Separation Stage D
Separation of the bitter substances from the tannins

| Ex. No. | Solution Used[3] (Ex.No.) | Solvent System — Hydrocarbon phase Composition (parts by volume) | Quantity in l. | Solvent System — Alcoholic phase Composition (mixture with water) | Quantity in l. | No. of extraction stages[1] z = | Solvent phase recovered[2] HC*—solution content of NS BS T | x = | Raffinate phase recovered[2] Alcoholic-aqueous solution content of NS BS T | y = |
|---|---|---|---|---|---|---|---|---|---|---|
| 31 | 9 | pentane fraction | 4.97 | 90% by vol. methanol | 0.7 | 14 | N= 0.04g = 0.1% B=25.67 g =99.4% T= 0.12g = 0.5% | 8–14 | N=0 g=0 % B= 0.36g = 1.4% T=25.68g =98.6% | 1–8 |
| 32 | 10 | hexane fraction | 2.85 | 70% by vol. methanol | 1 | 11 | N= 0.06g = 0.2% B=33 g =98.6% T= 0.42g = 1.2% | 6–11 | N=0 g=0 % B= 0.31g = 0.7% T=44.27g =99.3% | 1–6 |
| 33 | 11 | hexane fraction | 3.5 | 80% by vol. ethanol | 0.7 | 9 | N= 0.10g = 0.3% B=33.20g =98.9% T= 0.26g = 0.8% | 5–9 | N=0 g=0 % B= 0.28g = 0.9% T=30.89g =99.1% | 1–5 |
| 34 | 12 | heptane fraction | 5.6 | 76.9% by vol. ethanol | 1 | 7 | N= 0.04g = 0.1% B=29.80g =99.5% T= 0.13g = 0.4% | 4–7 | N=0 g=0 % B= 0.11g = 0.3% T=32.33g =99.7% | 1–4 |
| 35 | 13 | octane fraction | 3.85 | 80% by vol. methanol | 0.7 | 16 | N= 0.03g = 0.2% B=22.08g =97.9% T= 0.44g = 1.9% | 8–16 | N=0 g=0 % B= 0.17g = 0.8% T=22.54g =99.2% | 1–8 |
| 36 | 14 | octane fraction | 7.7 | 80% by vol. ethanol | 1 | 8 | N= 0.02g = 0.1% B=31.67g =99.7% T= 0.07g = 0.2% | 5–8 | N=0 g=0 % B= 0.06g = 0.2% T=30.09g =99.8% | 1–4 |
| 37 | 15 | decane fraction | 3.4 | 80% by vol. methanol | 1 | 11 | N= 0.02g = 0.1% B=35.29g =99.2% T= 0.27g = 0.7% | 6–11 | N=0 g=0 % B= 0.22g = 0.5% T=47.69g =99.5% | 1–6 |
| 38 | 16 | decane fraction | 5.18 | 90% by vol. ethanol | 0.7 | 26 | N= 0.01g =<0.1% B=24.89g =99.4% T= 0.14g = 0.6% | 14–26 | N=0 g=0 % B= 0.14g = 0.6% T=25.02g =99.4% | 1–13 |
| 39 | 17 | decane fraction | 6.09 | 80% by vol. n-propanol | 0.7 | 26 | N= 0.02g = 0.1% B=22.54g =96.8% T= 0.71g = 3.1% | 13–26 | N=0 g=0 % B= 1.05g = 6.5% T=15.00g =93.5% | 1–14 |
| 40 | 18 | cyclohexane | 3.73 | 70% by vol. methanol | 1 | 7 | N= 0.39g = 1.4% B=27.97g =98.1% T= 0.16g = 0.5% | 4–7 | N=0 g=0 % B= 0.08g = 0.2% T=49.23g =99.8% | 1–4 |
| 41 | 19 | cyclohexane | 3.15 | 60% by vol. methanol | 1 | 7 | N= 0.01g =<0.1% B=41.03g =99.5% T= 0.19g = 0.5% | 4–7 | N=0 g=0 % B= 0.16g = 0.3% T=46.26g =99.7% | 1–4 |
| 42 | 20 | hexane fraction benzene(5:5) | 4.1 | 90% by vol. methanol | 1 | 9 | N= 0.02g = 0.1% B=24.78g =99.2% T= 0.17g = 0.7% | 5–9 | N=0 g=0 % B= 0.17g = 0.6% T=26.37g =99.4% | 1–5 |
| 43 | 20 | hexane fraction benzene(8:2) | 3.6 | 75% by vol. methanol | 1 | 7 | N= 0.02g = 0.1% B=25.59g =99.2% T= 0.19g = 0.7% | 4–7 | N=0 g=0 % B= 0.18g = 0.6% T=28.26g =99.4% | 1–4 |

Table 4

Separation Stage D
Separation of the bitter substances from the tannins

| Ex. No. | Solution Used[3] (Ex.No.) | Solvent System — Hydrocarbon phase Composition (parts by volume) | Quantity in l. | Solvent System — Alcoholic phase Composition (mixture with water) | Quantity in l. | No. of extraction stages[1] z = | Solvent phase recovered[2] HC*—solution content of NS BS T | x = | Raffinate phase recovered[2] Alcoholic-aqueous solution content of NS BS T | y = |
|---|---|---|---|---|---|---|---|---|---|---|
| 44 | 21 | hexane fraction benzene(5:5) | 2.8 | 80% by vol. methanol | 1 | 6 | N= 0.01g = 0.1% B=30.05g =97.7% T= 0.69g = 2.3% | 3–6 | N=0 g= 0 % B= 0.42g = 0.9% T=47.74g = 99.1% | 1–4 |
| 45 | 22 | hexane fraction benzene(2:8) | 2.2 | 80% by vol. methanol | 1 | 9 | N= 0.04g = 0.1% B=42.06g =99.4% T= 0.22g = 0.5% | 5–9 | N=0 g= 0 % B= 0.18g = 0.3% T=50.54g = 99.7% | 1–5 |
| 46 | 23 | hexane fraction benzene (10:1) | 7.4 | 80% by vol. ethanol | 1 | 7 | N= 0.04g = 0.1% B=26.37g =99.2% T= 0.19g = 0.7% | 4–7 | N=0 g= 0 % B= 0.17g = 0.6% T=28.71g = 99.4% | 1–4 |

Table 4 — Continued

Separation Stage D
Separation of the bitter substances from the tannins

| Ex. No. | Solution Used[3] (Ex.No.) | Solvent System — Hydrocarbon phase Composition (parts by volume) | Hydrocarbon Quantity in l. | Alcoholic phase Composition (mixture with water) | Alcoholic Quantity in l. | No. of extraction stages[1] z = | Solvent phase recovered[2] HC*—solution x = | content of NS BS T | Raffinate phase recovered[2] Alcoholic-aqueous solution y = | content of NS BS T |
|---|---|---|---|---|---|---|---|---|---|---|
| 47 | 24 | hexane fraction toluene(6:4) | 4.0 | 80% by vol. methanol | 1 | 5 | 3–5 | N=0.05g = 0.1% <br> B=37.89g =99.6% <br> T=0.12g = 0.3% | 1–3 | N=0 g = 0 % <br> B=0.07g = 0.1% <br> T=51.09g =99.9% |
| 48 | 25 | hexane fraction cyclohexane | 3.7 | 80% by vol. methanol | 1 | 11 | 6–11 | N=0.07g = 0.2% <br> B=43.10g =98.9% <br> T=0.41g = 0.9% | 1–6 | N=0 g = 0 % <br> B=0.41g = 0.9% <br> T=47.50g =99.1% |
| 49 | 26 | hexane fraction cyclohexane (3:7) | 2.9 | 80% by vol. ethanol | 1 | 26 | 14–26 | N=0.01g = 0.1% <br> B=22.84g =99.4% <br> T=0.13g = 0.6% | 1–13 | N=0 g = 0 % <br> B=0.10g = 0.4% <br> T=23.67g =99.6% |
| 50 | 27 | heptane fraction benzene(8:2) | 8.81 | 90% by vol. methanol | 1 | 11 | 6–11 | N=0.03g = 0.1% <br> B=35.83g =98.5% <br> T=0.53g = 1.4% | 1–6 | N=0 g = 0 % <br> B=0.36g = 0.7% <br> T=47.36g =99.3% |
| 51 | 27 | heptane fraction benzene (10:1) | 4.71 | 80% by vol. methanol | 1 | 5 | 3–5 | N=0.03g = 0.1% <br> B=37.56g =99.4% <br> T=0.18g = 0.5% | 1–3 | N=0 g = 0 % <br> B=0.36g = 0.7% <br> T=55.19g =99.8% |
| 52 | 27 | heptane fraction benzene (15:1) | 2.17 | 70% by vol. methanol | 1 | 5 | 3–5 | N=0.03g = 0.1% <br> B=37.97g =99.5% <br> T=0.14g = 0.4% | 1–3 | N=0 g = 0 % <br> B=0.09g = 0.2% <br> T=55.84g =99.8% |
| 53 | 27 | heptane fraction benzene (15:1) | 2.02 | 60% by vol. methanol | 1 | 5 | 3–5 | N=0.03g = 0.1% <br> B=39.17g =99.8% <br> T=0.04g = 0.1% | 1–3 | N=0 g = 0 % <br> B=0.02g = 0.1% <br> T=57.39g =100 % |
| 54 | 23 | heptane fraction benzene (10:1) | 5.61 | 80% by vol. ethanol | 1 | 8 | 5–8 | N=0.15g = 0.5% <br> B=28.69g =99.3% <br> T=0.05g = 0.2% | 1–4 | N=0 g = 0 % <br> B=0.05g = 0.2% <br> T=31.35g =99.8% |
| 55 | 28 | heptane fraction benzene (10:1) | 3.0 | 70% by vol. ethanol | 1 | 6 | 4–6 | N=0.15g = 0.5% <br> B=30.45g =99.4% <br> T=0.03g = 0.1% | 1–3 | N=0 g = 0 % <br> B=0.03g = 0.1% <br> T=32.98g =99.9% |
| 56 | 29 | octane fraction cyclohexane (5:5) | 2.6 | 90% by vol. ethanol | 0.7 | 26 | 13–26 | N=0.04g = 0.2% <br> B=22.73g =96.3% <br> T=0.84g = 3.5% | 1–14 | N=0 g = 0 % <br> B=0.91g = 4.1% <br> T=21.04g =95.9% |
| 57 | 30 | decane fraction benzene(7:3) | 3.68 | 70% by vol. methanol | 2 | 5 | 3–5 | N=0.05g = 0.1% <br> B=50.82g =99.7% <br> T=0.13g = 0.2% | 1–3 | N=0 g = 0 % <br> B=0.10g = 0.2% <br> T=61.71g =99.8% |

Table 4a

Separation Stage D
Separation of the bitter substances and the tannins

| Ex. No. | Solution Used[3] (Ex.No.) | Solvent System — Hydrocarbon phase Composition (parts by volume) | Hydrocarbon Quantity in l. | Alcoholic phase Composition (mixture with water) | Alcoholic Quantity in l. | No. of extraction stages[1] z = | Solvent phase recovered[2] HC*—solution x = | content of NS BS T | Raffinate phase recovered[2] Alcoholic-aqueous solution y = | content of NS BS T |
|---|---|---|---|---|---|---|---|---|---|---|
| 57a | 30a | cyclooctane | 6.395 | 90% by vol. methanol | 0.800 | 12 | 7–12 | N=0.00g = 0.0% <br> B=21.16g =99.6% <br> T=0.09g = 0.4% | 1–6 | N=0.00g =0.0% <br> B=0.07g =0.3% <br> T=25.85g =99.7% |
| 57b | 30c | heptane fraction benzene (15:1) | 4.619 | 90% by weight methanol | 4.480 | 7 | 4–7 | N=<0.01g =<0.1% <br> B=43.39g =99.8% <br> T=0.10g = 0.2% | 1–4 | N=0.00g =0.0% <br> B=0.16g =0.6% <br> T=28.15g =99.4% |
| 57c | 30a | octane fraction cyclohexane (7:3) | 28.780 | 80% by vol. methanol | 0.400 | 8 | 5–8 | N=0.01g = 0.1% <br> B=15.62g =99.7% <br> T=0.03g = 0.2% | 1–4 | N=0.00g =0.0% <br> B=0.02g =0.1% <br> T=23.17g =99.9% |

Table 4a—Continued

Separation Stage D
Separation of the bitter substances and the tannins

| Ex. No. | Solution Used[3] (Ex.No.) | Solvent System Hydrocarbon phase Composition (parts by volume) | Quantity in l. | Solvent System Alcoholic phase Composition (mixture with water) | Quantity in l. | No. of extraction stages[1] z = | x = | Solvent phase recovered[2] HC*—solution content of NS BS T | y = | Raffinate phase recovered[2] Alcoholic-aqueous solution content of NS BS T |
|---|---|---|---|---|---|---|---|---|---|---|
| 57d | 30d | benzene | 1.054 | 90% by vol. methanol | 0.500 | 10 | 6–10 | N= 0.00g = 0.0%<br>B= 8.71g =99.7%<br>T= 0.02g = 0.3% | 1–5 | N= 0.00g = 0.0%<br>B= 0.02g = 0.2%<br>T=10.72g =99.8% |
| 57e | 30e | benzene | 2.298 | 60% by vol. methanol | 5.850 | 5 | 3–5 | N=<0.01g = <0.1%<br>B= 9.00g =100.0%<br>T=<0.01g = <0.1% | 1–3 | N= 0.00g = 0.0%<br>B= 0.02g = 1.0%<br>T= 1.86g =99.0% |
| 57f | 30 | benzene | 0.784 | 60% by vol. methanol | 2.000 | 5 | 3–5 | N= 0.02g = 0.1%<br>B=24.54g =99.5%<br>T= 0.09g = 0.4% | 1–3 | N= 0.00g = 0.0%<br>B= 0.05g = 0.1%<br>T=43.92g =99.9% |
| 57g | 30g | benzene | 1.790 | 70% by vol. ethanol | 2.000 | 9 | 5–9 | N= 0.03g = 0.1%<br>B=20.61g =99.4%<br>T= 0.10g = 0.5% | 1–5 | N= 0.00g = 0.0%<br>B= 0.08g = 0.3%<br>T=24.89g =99.7% |
| 57h | 30h | benzene | 7.840 | 60% by vol. methanol | 20.507 | 5 | 3–5 | N= 0.00g = 0.0%<br>B=31.99g =99.8%<br>T= 0.06g = 0.2% | 1–3 | N= 0.00g = 0.0%<br>B= 0.07g = 0.2%<br>T=26.82g =99.8% |

Table 5

Separation Stage A
Separation of the neutral and bitter substances (= soft resins) from the tannins

| Ex. No. | Primary Extract Solution Used (Ex.No.) | Solvent System Hydrocarbon phase Composition (parts by volume) | Quantity in l. | Solvent System Alcoholic phase Composition (mixture with water) | Quantity in l. | No. of extraction stages[1] z = | x = | Solvent phase recovered[2] HC*—solution content of SR=soft resins T=tannins | y = | Raffinate phase recovered[2] Alcoholic-aqueous solution content of SR=soften resins T=tannins |
|---|---|---|---|---|---|---|---|---|---|---|
| 58 | 7 | heptane fraction | 2.44 | 70% by vol. n-propanol | 1 | 7 | 4–7 | SR=42.59g = 99.8%<br>T= 0.10g = 0.2% | 1– | SR= 0.18g = 0.9%<br>T=19.74g =99.1% |
| 59 | 7 | octane fraction | 5.0 | 85% by vol. n-propanol | 0.5 | 9 | 5–9 | SR=24.85g = 99.8%<br>T= 0.05g = 0.2% | 1–5 | SR= 0.09g = 0.7%<br>T=11.37g =99.3% |
| 60 | 8 | octane fraction | 3.0 | 80% by vol. i-propanol | 0.5 | 11 | 6–11 | SR=21.66g = 97.5%<br>T= 0.55g = 2.5% | 1–6 | SR= 0.11g = 1.0%<br>T= 10.33g =99.0% |
| 61 | 8 | nonane fraction | 3.6 | 80% by vol. methanol | 3.6 | 6 | 4–6 | SR=73.55 g = 99.9%<br>T= 0.88g = 0.1% | 1–3 | SR= 0.09g = 0.2%<br>T=53.54g =99.8% |
| 62 | 2 | cyclopentane | 2.30 | 80% by vol. methanol | 1 | 5 | 3–5 | SR=51.05g = 99.7%<br>T= 0.16g = 0.3% | 1–3 | SR= 0.18g = 0.4%<br>T=50.01g =99.6% |
| 63 | 1 | cyclooctane | 1.67 | 70% by vol. methanol | 1 | 5 | 3–5 | SR=34.16g = 99.9%<br>T= 0.04g = 0.1% | 1–3 | SR= 0.08g = 0.3%<br>T=24.95g =99.7% |
| 64 | 3 | hexane fraction (10:1) | 4.05 | 90% by vol. methanol | 0.5 | 13 | 7–13 | SR=37.11g = 99.4%<br>T= 0.21g = 0.6% | 1–7 | SR= 0.24g = 0.9%<br>T=26.39g =99.1% |
| 65 | 4 | hexane fraction benzene(8:2) | 3.5 | 80% by vol. methanol | 1 | 8 | 5–8 | SR=29.10g = 99.8%<br>T= 0.07g = 0.2% | 1–4 | SR= 0.04g = 0.1%<br>T=48.31g =99.9% |
| | | hexane | | | | | | SR=27.97g = 99.3% | | SR= 0.09g = 0.2% |

Table 5 — Continued

Separation Stage A
Separation of the neutral and bitter substances (= soft resins) from the tannins

| Ex. No. | Primary Extract Solution Used (Ex.No.) | Solvent System Hydrocarbon phase Composition (parts by volume) | Quantity in l. | Solvent System Alcoholic phase Composition (mixture with water) | Quantity in l. | No. of extraction stages[1] z = | x = | Solvent phase recovered[2] HC*—solution content of SR=soft resins T=tannins | y = | Raffinate phase recovered[2] Alcoholic-aqueous solution content of SR=soft resins T=tannins |
|---|---|---|---|---|---|---|---|---|---|---|
| 66 | 4 | fraction benzene(6:4) | 2.5 | 75% by vol. methanol | 1 | 7 | 4–7 | T= 0.19g = 0.7% SR= 26.98g = 99.4% | 1–4 | T=46.66g =99.8% SR= 0.07g = 0.1% |
| 67 | 4 | fraction benzene(6:4) | 2.8 | 70% by vol. methanol | 1 | 5 | 3–5 | T= 0.16g = 0.6% SR=47.08g = 99.8% | 1–3 | T=45.59g =99.9% SR= 0.16g = 0.5% |
| 68 | 6 | fraction benzene (10:1) | 6.0 | 90% by vol. ethanol | 1 | 12 | 7–12 | T= 0.12g = 0.2% SR=44.12g =100.% | 1–6 | T=29.50g =99.5% SR= 0.02g = 0.1% |
| 69 | 6 | fraction benzene(7:3) | 4.3 | 90% by vol. | 1 | 26 | 15–26 | T= 0.02g = <0.1% SR=45.73g = 99.4% | 1–12 | T=26.83g =99.9% SR= 0.35g = 1.2% |
| 70 | 6 | fraction benzene(5:5) | 3.3 | 80% by vol. ethanol | 1 | 8 | 5–8 | T= 0.27g = 0.6% | 1–3 | T=28.96g =98.8% |

Table 6

Separation Stage A
Separation of the neutral and bitter substances (= soft resins) from the tannins

| Ex. No. | Primary Extract Solution Used (Ex.No.) | Solvent System Hydrocarbon phase Composition (parts by volume) | Quantity in l. | Solvent System Alcoholic phase Composition (mixture with water) | Quantity in l. | No. of extraction stages[1] z = | x = | Solvent phase recovered[2] HC*—solution content of SR=soft resins T=tannins | y = | Raffinate phase recovered[2] Alcoholic-aqueous solution content of SR=soft resins T=tannins |
|---|---|---|---|---|---|---|---|---|---|---|
| 71 | 6 | hexane fraction toluene(6:4) | 4.1 | 80% by vol. ethanol | 1 | 6 | 4–6 | SR=46.80g =99.9% T=0.03g =0.1% | 1–3 | SR= 0.05g = 0.1% T=29.59g =99.9% |
| 72 | 2 | hexane fraction xylene(6:4) | 3.2 | 80% by vol. methanol | 1 | 6 | 4–6 | SR=50.23g =99.9% T=0.05g =0.1% | 1–3 | SR= 0.04g = 0.1% T=48.14g =99.9% |
| 73 | 4 | hexane fraction xylene(5:5) | 3.0 | 80% by vol. methanol | 1 | 9 | 5–9 | SR=70.43g =99.9% T= 0.31g = 0.4% | 1–5 | SR= 0.33g = 0.6% T=50.55g =99.4% |
| 74 | 6 | hexane fraction xylene(5:5) | 4.8 | 80% by vol. ethanol | 1 | 6 | 4–6 | SR=46.51g =99.9% T= 0.04g = 0.1% | 1–3 | SR= 0.06g = 0.2% T=29.81g =99.8% |
| 75 | 4 | heptane fraction benzene(8:2) | 2.73 | 80% by vol. methanol | 1 | 5 | 3–5 | SR=30.92g =99.5% T= 0.17g = 0.5% | 1–3 | SR= 0.10g = 0.2% T=51.94g =99.8% |
| 76 | 5 | heptane fraction benzene (10:1) | 2.13 | 70% by vol. methanol | 1 | 5 | 3–5 | SR=43.43g =99.8% T= 0.11g = 0.2% | 1–3 | SR= 0.08g = 0.2% T=41.33g =99.8% |
| 77 | 1 | heptane fraction benzene(8:2) | 1.79 | 70% by vol. methanol | 1 | 5 | 3–5 | SR=33.83g =99.8% T= 0.08g = 0.2% SR=47.52g =99.6% | 1–3 | SR=0.09g = 0.4% T=24.42g =99.6% SR= 0.19g = 0.6% |

Table 6—Continued

Separation Stage A
Separation of the neutral and bitter substances (= soft resins) from the tannins

| Ex. No. | Primary Extract Solution Used (Ex.No.) | Solvent System Hydrocarbon phase Composition (parts by volume) | Quantity in l. | Solvent System Alcoholic phase Composition (mixture with water) | Quantity in l. | No. of extraction stages[1] z = | x = | Solvent phase recovered[2] HC*—solution content of SR=soft resins T=tannins | y = | Raffinate phase recovered[2] Alcoholic-aqueous solution content of SR=soft resins T=tannins |
|---|---|---|---|---|---|---|---|---|---|---|
| 78 | 6 | fraction benzene (10:1) | 7.51 | 85% by vol. ethanol | 1 | 9 | 5–9 | T= 0.17g = 0.4% | 1–5 | T=29.87g =99.4% |
|  |  | heptane |  |  |  |  |  | SR=37.24g =99.8% |  | SR= 0.09g = 0.4% |
| 79 | 6 | fraction benzene (10:1) | 2.01 | 60% by vol. ethanol | 1 | 5 | 3–5 | T= 0.06g = 0.2% | 1–3 | T=23.92 g =99.6% |
|  |  | octane |  |  |  |  |  | SR=33.95g = 99.8% |  | SR= 0.09g = 0.4% |
| 80 | 1 | fraction benzene(7:3) | 1.40 | 70% by vol. methanol | 1 | 5 | 3–5 | T= 0.07 g = 0.2% | 1–3 | T=24.57g =99.6% |
|  |  | octane |  |  |  |  |  | SR=46.54g =99.6% |  | SR=0.16g = 0.4% |
| 81 | 5 | fraction cyclohexane (5:2) | 4.5 | 80% by vol. methanol | 1 | 7 | 4–7 | T= 0.17g = 0.4% | 1–4 | T=44.06g =99.6% |
| 82 | 4 | cyclopentane | 5.69 | 90% by vol. methanol | 1 | 9 | 5–9 | SR=32.36g =99.4% |  | SR= 0.10g = 0.2% |
|  |  | benzene(7:3) |  |  |  |  |  | T= 0.20g = 0.6% | 1–5 | T=53.37g =99.8% |
| 83 | 5 | cyclohexane | 1.36 | 70% by vol. methanol | 1 | 5 | 3–5 | SR=43.82g =99.9% |  | SR= 0.07g = 0.2% |
|  |  | benzene (10:1) |  |  |  |  |  | T= 0.05g = 0.1% | 1–3 | T=42.16g =99.8% |

Table 6a

Separation Stage A
Separation of the neutral and bitter substances (= soft resins) from the tannins

| Ex. No. | Primary Extract Solution Used (Ex.No.) | Solvent System Hydrocarbon phase Composition (parts by volume) | Quantity in l. | Solvent System Alcoholic phase Composition (mixture with water) | Quantity in l. | No. of extraction stages[1] z = | x = | Solvent phase recovered[2] HC*—solution content of SR=soft resins T=tannins | y = | Raffinate phase recovered[2] Alcoholic-aqueous solution content of SR=soft resins T=tannins |
|---|---|---|---|---|---|---|---|---|---|---|
|  |  | octane |  |  |  |  |  | N= 5.05g =15.5% |  | N=<<0.01g =<<0.1% |
| 83a | 8 | fraction benzene(7:3) | 1.613 | 75% by vol. isopropanol | 0.750 | 6 | 4–6 | B= 27.50g =84.4% T= 0.02g =0.1% | 1–3 | B= 0.03g = 0.2% T= 18.60g = 99.8% |
|  |  | octane |  |  |  |  |  | N= 3.11g =13.7% |  | N=<<0.01g =<<0.1% |
| 83b | 5 | fraction cyclohexane (7:3) | 3.450 | 80% by vol. ethanol | 0.500 | 8 | 5–8 | B= 19.58g =86.2% T= 0.04g = 0.2% | 1–4 | B= 0.03g = 0.2% T= 21.41g = 99.8% |
| 83c | 3 | benzene | 2.225 | 80% by vol. methanol | 2.500 | 6 | 4–6 | N=28.21g =15.5% B=155.85g =84.4% T= 0.15g =<0.1% | 1–3 | N= <0.01g =<<0.1% B= 0.18g = 0.1% T=135.21g = 99.9% |
| 83d | 2 | benzene | 0.82 | 60% by vol. ethanol | 1.000 | 5 | 3–5 | N= 5.25g =14.5% B= 30.75g =85.1% T= 0.15g = 0.4% | 1–3 | N= <0.01g = 0.0% B= 0.13g = 0.4% T= 34.99g = 99.6% |
| 83e | 6 | benzene | 1.045 | 80% by vol. ethanol | 0.500 | 6 | 4–6 | N= 3.66g =15.6% B= 19.86g =84.4% T= 0.02g =<0.1% | 1–3 | N= 0.00g = 0.0% B= 0.02g = 0.1% T= 15.09g = 99.9% |
| 83f | 8 | benzene | 0.894 | 80% by vol. methanol | 1.000 | 6 | 4–6 | N= 15.36g =21.5% B= 56.21g =78.5% T= 0.01g =<0.1% N= 7.99g =21.7% | 1–3 | N= <0.01g = 0.1% B= 0.06g = 0.8% T= 7.97g = 99.2% N= <0.01g = <0.1% |

Table 6a—Continued

Separation Stage A
Separation of the neutral and bitter substances (= soft resins) from the tannins

| Ex. No. | Primary Extract Solution Used (Ex.No.) | Solvent System Hydrocarbon phase Composition (parts by volume) | Quantity in l. | Solvent System Alcoholic phase Composition (mixture with water) | Quantity in l. | No. of extraction stages[1] z = | Solvent phase recovered[2] HC*—solution content of x = SR=soft resins T=tannins | y = | Raffinate phase recovered[2] Alcoholic-aqueous solution content of SR=soft resins T=tannins |
|---|---|---|---|---|---|---|---|---|---|
| 83g | 8 | benzene | 0.405 | 60% by vol. ethanol | 0.500 | 5 | 3–5 | B= 28.75g =78.2%<br>T= 0.02g<br>=<0.1% | 1–3 | B= 0.12g = 2.9%<br>T= 4.08g = 97.1% |
| 83h | 1 | toluene | 0.235 | 70% by vol. methanol | 0.500 | 6 | 4–6 | N= 2.17g =13.2%<br>B= 14.27g =86.8%<br>T= 0.01g =<0.1% | 1–3 | N= <0.01g = <0.1%<br>B= 0.01g = 0.1%<br>T= 12.02g = 99.9% |
| 83i | 6 | xylene | 1.180 | 80% by vol. ethanol | 0.500 | 4 | 2–4 | N= 3.77g =15.2%<br>B= 20.86g =84.0%<br>T= 0.20g = 0.8% | 1–3 | N= 0.01g = 0.1%<br>B= 0.26g = 1.6%<br>T= 15.85g =98.3% |
| 83k | 2 | methylene chloride | 0.200 | 70% by vol. methanol | 0.500 | 7 | 4–7 | N= 3.09g =14.2%<br>B= 18.63g =85.5%<br>T= 0.07g =0.3% | 1–4 | N= <0.01g = <0.1%<br>B= 0.06g = 0.3%<br>T= 21.20g =99.7% |
| 83l | 8d | methylene chloride | 1.000 | 70% by vol. methanol | 2.500 | 8 | 5–8 | N= 10.20g =13.6%<br>B= 64.77g =86.4%<br>T= <0.01g =0.0% | 1–4 | N= <0.01g = <0.1%<br>B= 0.04g = 1.7%<br>T= 2.34g = 98.2% |
| 83m | 8d | methylene chloride | 0.500 | 60% by vol. methanol | 1.320 | 4 | 3–4 | N= 5.52g =13.6%<br>B= 32.38g =86.4%<br>T= 0.00g =0.0% | 1–2 | N= 0.00g = 0.0%<br>B= 0.01g = 0.9%<br>T= 1.26g =99.1% |

*or halogenated hydrogen

Table 7

Separation Stage B
Separation of the neutral substances from the bitter substances

| Ex. No. | Solution Used[4] (Ex. No.) | Solvent System Hydrocarbon phase Composition (parts by volume) | Quantity in l. | Solvent System Alcoholic phase Composition (mixture with water) | Quantity in l. | No. of extraction stages[1] z= | Solvent phase recovered[2] HC*—solution content of NS BS T x= | y= | Raffinate phase recovered[2] Alcoholic-aqueous solution content of NS BS T |
|---|---|---|---|---|---|---|---|---|---|
| 84 | 61 | hexane fraction | 1 | 80% by vol. methanol | 2.70 | 11 | 6–11 | B=0.34g = 3.5%<br>T=0  g =0 % | 1–6 | B=49.61g =99.7%<br>T=0.08g = 0.1% |
| 85 | 58 | octane fraction | 0.70 | 80% by vol. n-propanol | 1.19 | 26 | 15–26 | N=4.54g =99.5%<br>B=0.02g = 0.5%<br>T=  g =0 % | 1–12 | N=0.01g =<0.1%<br>B=26.36g =99.5%<br>T=0.09g = 0.4% |
| 86 | 59 | octane fraction | 0.50 | 80% by vol. n-propanol | 0.85 | 26 | 15–26 | N=2.85g =99.6%<br>B=0.01g = 0.4%<br>T=0  g =0 % | 1–12 | N=0.01g =<0.1%<br>B=15.17g =99.7%<br>T=0.05g = 0.3% |
| 87 | 60 | octane fraction | 1 | 80% by vol. i-propanol | 1.61 | 26 | 13–26 | N=2.49g =87.5%<br>B=0.36g =12.5%<br>T=0  g =0 % | 1–14 | N=0.07g = 0.5%<br>B=12.32g =95.5%<br>T=0.52g =04.0% |
| 88 | 62 | cyclopentane | 1 | 90% by vol. methanol | 3.01 | 16 | 8–16 | N=5.51g =88.5%<br>B=0.71g =11.5%<br>T=0  g =0 % | 1–8 | N=0  g =0 %<br>B=32.04g =99.5%<br>T=0.16g = 0.5% |
| 89 | 63 | pentane fraction toluene(7:3) | 0.50 | 80% by vol. methanol | 4.55 | 26 | 13–26 | N=3.09g =81.6%<br>B=0.70g =18.4%<br>T=0  g =0 % | 1–14 | N=0.15g = 0.8%<br>B=18.7g =99.0%<br>T=0.04g = 0.2% |
| 90 | 64 | hexane fraction benzene (10:1) | 1 | 90% by vol. methanol | 1.39 | 16 | 9–16 | N=4.88g =97.7%<br>B=0.11g = 2.3%<br>T=0  g =0 % | 1–8 | N=0.02g = 0.1%<br>B=22.72g =99.0%<br>T=0.20g = 0.9% |
| 91 | 66 | hexane fraction benzene(8:2) | 1 | 90% by vol. methanol | 1.67 | 26 | 15–26 | N=2.92g =99.5%<br>B=0.01g =0.5%<br>T=0  g =0 % | 1–12 | N=0.01g =<0.1%<br>B=17.45g =99.0%<br>T=0.18g = 1.0% |
| 92 | 65 | hexane fraction benzene(8:2) | 1 | 85% by vol. methanol | 2.56 | 16 | 8–16 | N=3.25g =87.5%<br>B=0.47g =12.5%<br>T=0  g =0 % | 1–8 | N=0.07g = 0.4%<br>B=17.90g =99.2%<br>T=0.07g = 0.4% |

Table 7 — Continued

Separation Stage B
Separation of the neutral substances from the bitter substances

| Ex. No. | Solution Used[4] (Ex.No.) | Solvent System | | | | No. of extraction stages[1] z = | Solvent phase recovered[2] HC*—solution content of | | Raffinate phase recovered[2] Alcoholic-aqueous solution content of | |
|---|---|---|---|---|---|---|---|---|---|---|
| | | Hydrocarbon phase | | Alcoholic phase | | | | | | |
| | | Composition (parts by volume) | Quantity in l. | Composition (mixture with water) | Quantity in l. | | x = | NS BS T | y = | NS BS T |
| 93 | 67 | hexane fraction benzene(8:2) | 1 | 70% by vol. methanol | 5.00 | 26 | 14–26 | N= 2.81g =97.6% B= 0.07g = 2.4% T= 0    g = 0 % | 1–13 | N= 0.01g = 0.1% B=16.42g =99.0% T= 0.16g = 0.9% |
| 94 | 68 | hexane fraction benzene (15:1) | 1 | 90% by vol. ethanol | 0.95 | 26 | 14–26 | N= 5.52g =96.0% B= 0.23g = 4.0% T= 0    g = 0 % | 1–13 | N= 0.05g = 0.2% B=26.92g =99.4% T= 0.11g = 0.4% |
| 95 | 69 | hexane fraction benzene(8:2) | 1 | 90% by vol. ethanol | 1.27 | 26 | 15–26 | N= 4.94g =96.5% B= 0.18g = 3.5% T= 0    g = 0 % | 1–14 | N= 0.22g = 0.9% B=23.84g =99.1% T= 0.01g =<0.1% |
| 96 | 70 | hexane fraction benzene(7:3) | 1 | 80% by vol. ethanol | 2.56 | 26 | 14–26 | N= 5.16g =96.4% B= 0.19g = 3.6% T= 0    g = 0 % | 1–13 | N= 0.04g = 0.1% B= 25.94g =98.9% T= 0.26g = 1.0% |
| 97 | 64 | hexane fraction benzene(6:4) | 1 | 80% by vol. ethanol | 4.00 | 26 | 15–26 | N= 5.38g =99.6% B= 0.02g = 0.4% T= 0    g = 0 % | 1–13 | N= 0.01g =<0.1% B=28.29g =99.8% T= 0.04g = 0.2% |

Table 8

Separation Stage B
Separation of the neutral substances from the bitter substances

| Ex. No. | Solution Used[4] (Ex.No.) | Solvent System | | | | No. of extraction stages[1] z = | Solvent phase recovered[2] HC*—solution content of | | Raffinate phase recovered[2] Alcoholic-aqueous solution content of | |
|---|---|---|---|---|---|---|---|---|---|---|
| | | Hydrocarbon phase | | Alcoholic phase | | | | | | |
| | | Composition (parts by volume) | Quantity in l. | Composition (mixture with water) | Quantity in l. | | x = | NS BS T | y = | NS BS T |
| 98 | 71 | hexane fraction toluene(6:4) | 1 | 90% by vol. methanol | 3.70 | 31 | 18—31 | N= 4.15g =95.1% B= 0.21g = 4.9% T= 0    g = 0 % | 1–17 | N= 0.40g = 1.5% B=25.22g =98.% T= 0.01g = 0.1% |
| 99 | 72 | hexane fraction xylene(6:4) | 1 | 90% by vol. methanol | 5.00 | 8 | 5–8 | N= 6.45g =99.2% B= 0.05g = 0.8% T= 0    g = 0 % | 1–4 | N= 0.40g = 1.5% B=36.56g =99.9% T= 0.05g = 0.1% |
| 100 | 73 | hexane fraction xylene(5:5) | 1 | 80% by vol. methanol | 4.76 | 26 | 14–26 | N= 8.57g =98.5% B= 0.24g = 1.5% T= 0    g = 0 % | 1–13 | N= 0.03g = 0.1% B=42.68g =99.2% T= 0.31g = 0.7% |
| 101 | 76 | heptane fraction benzene (10:1) | 1 | 932.2% by vol. methanol | 1.18 | 16 | 9–16 | N= 4.06g =95.4% B= 0.17g = 4.1% T= 0    g = 0 % | 1–8 | N= 0.02g = 0.1% B=27.92g =99.5% T= 0.11g = 0.4% |
| 102 | 77 | heptane fraction benzene (10:1) | 1 | 93.2% by vol. methanol | 1.18 | 16 | 0991 16 | N= 3.56g =96.4% B= 0.13g = 3.6% T= 0    g = 0 % | 1–8 | N= 0.02g = 0.1% B=21.35g =99.5% T= 0.08g = 0.4% |
| 103 | 75 | heptane fraction benzene(8:2) | 0.5 | 93.2% by vol. methanol | 0.65 | 16 | 8–16 | N= 3.28g =89.2% B= 0.40g =10.8% T= 0    g = 0 % | 1–9 | N=0.07g = 0.4% B=19.64g =98.8% T= 0.16g = 0.8% |
| 104 | 78 | heptane fraction benzene (15:1) | 1 | 90% by vol. ethanol | 1.32 | 31 | 15–31 | N= 5.02g =77.5% B= 1.44g =2.23% T= 0    g = 0 % | 1–17 | N= 0.52g = 2.1% B=24.73g =97.3% T= 0.17g = 0.6% |
| 105 | 79 | heptane fraction benzene (10:1) | 1 | 90% by vol. ethanol | 1.10 | 26 | 13–26 | N= 3.97g =86.5% B= 0.62g =13.5% T= 0    g = 0 % | 1–14 | N= 0.10g = 0.4% B=21.48g =99.3% T= 0.06g = 0.3% |
| 106 | 82 | heptane fraction cyclopentane (5:5) | 0.5 | 80% by vol. methanol | 2.5 | 26 | 14–26 | N= 1.69g =93.0% B= 0.04g = 2.0% T= 0    g = 0 % | 1–13 | N= 0.01g = 0.1% B=10.18g =98.9% T= 0.10g = 1.0% |

Table 8 — Continued

Separation Stage B
Separation of the neutral substances from the bitter substances

| Ex. No. | Solution Used[4] (Ex.No.) | Solvent System | | | | No. of extraction stages[1] z = | Solvent phase recovered[2] | | Raffinate phase recovered[2] | |
|---|---|---|---|---|---|---|---|---|---|---|
| | | Hydrocarbon phase | | Alcoholic phase | | | HC*—solution content of NS BS T | | Alcoholic-aqueous solution content of NS BS T | |
| | | Composition (parts by volume) | Quantity in l. | Composition (mixture with water) | Quantity in l. | | x = | | y = | |
| 107 | 80 | octane fraction benzene (10:1) | 0.6 | 90% by vol. methanol | 1 | 26 | 14–26 | N= 3.48g =97.8%<br>B= 0.09g =2.4%<br>T= 0   g =0 % | 1–13 | N= 0.01g = 0.1%<br>B=20.72g =99.6%<br>T= 0.07g = 0.3% |
| 108 | 81 | octane cyclohexane (10:1) | 0.50 | 80% by vol. methanol | 1.79 | 26 | 14–26 | N= 4.49g =97.6%<br>B= 0.11g =2.4%<br>T= 0   g =0 % | 1–13 | N= 0.02g = 0.1%<br>B=28.82g =99.3%<br>T= 0.17g = 0.6% |
| 109 | 83 | octane fraction cyclohexane (10:1) | 0.70 | 80% by vol. methanol | 2.50 | 26 | 14–26 | N= 3.95g =97.4%<br>B= 0.11g =2.6%<br>T= 0   g =0 % | 1–13 | N= 0.01g =<0.1%<br>B=27.42g =99.8%<br>T= 0.05g = 0.2% |
| 110 | 82 | cyclopentane benzene(7:3) | 0.5 | 90% by vol. methanol | 1.25 | 26 | 14–26 | N= 1.74g =97.5%<br>B= 0.05g =2.5%<br>T= 0   g =0 % | 1–13 | N= 0.01g =<0.1%<br>B= 9.70g =98.9%<br>T= 0.10g = 1.0% |

Table 8a

Separation Stage B
Separation of the neutral substances from the bitter substances

| Ex. No. | Solution Used[4] (Ex.No.) | Solvent System | | | | No. of extraction stages[1] z = | Solvent phase recovered[2] | | Raffinate phase recovered[2] | |
|---|---|---|---|---|---|---|---|---|---|---|
| | | Hydrocarbon phase | | Alcoholic phase | | | HC*—solution content of NS BS T | | Alcoholic-aqueous solution content of NS BS T | |
| | | Composition (parts by volume) | Quantity in l. | Composition (mixture with water) | Quantity in l. | | x = | | y = | |
| 110 a | 83f | hexane-benzene (7:3) | 1.534 | 90% by vol. ethanol | 2.290 | 35 | 19–35 | NS=2.69g =99.1%<br>BS=0.02g = 0.9%<br>T=0.00g = 0.0% | 1–17 | NS=<0.01g = 0.1%<br>BS= 9.82g =99.9%<br>T=<0.10g =<0.1% |
| 110 b | 83a | octane fraction cyclohexane (10:1) | 0.630 | 90% by vol. ethanol | 0.800 | 23 | 13–23 | NS=3.59g =98.7%<br>BS=0.05g = 1.3%<br>T=0.00g = 0.0% | 1–11 | NS= 0.01g=<0.1%<br>BS=19.56g =99.9%<br>T= 0.02g =0.1% |
| 110 c | 83b | octane fraction cyclohexane (5:5) | 0.808 | 90% by vol. ethanol | 1.000 | 35 | 19–35 | NS=2.13g =98.5%<br>BS=0.03g = 1.5%<br>T=0.00g = 0.0% | 1–17 | NS=<0.01g =<0.1%<br>BS=13.41g =99.7%<br>T= 0.04g = 0.3% |
| 110 d | 83c | benzene | 0.045 | 70% by vol. methanol | 0.500 | 45 | 25–45 | NS=3.16g =99.7%<br>BS=0.01g = 0.3%<br>T=0.00g = 0.0% | 1–21 | NS=<0.01g = 0.1%<br>BS=17.48g =99.8%<br>T= 0.03g = 0.2% |
| 110 e | 83d | benzene | 0.042 | 70% by vol. ethanol | 0.450 | 70 | 37–70 | NS=1.45g =97.6%<br>BS=0.04g = 2.4%<br>T=0.00g = 0.0% | 1–34 | NS= <0.01g =<0.1%<br>BS= 8.52g =99.1%<br>T= 0.07g = 0.8% |
| 110 f | 83e | benzene | 0.017 | 70% by vol. ethanol | 0.180 | 70 | 37–70 | NS=2.25g =97.8%<br>BS=0.05g = 2.2%<br>T=0.00g = 0.02% | 1–34 | NS= 0.01g =<0.1%<br>BS=12.23g =99.8%<br>T= 0.02g = 0.2% |
| 110 g | 83g | benzene | 0.017 | 70% by vol. ethanol | 0.186 | 70 | 37–70 | NS=0.75g =98.5%<br>BS=0.01g = 1.5%<br>T=0.00g = 0.0% | 1–34 | NS=<0.01g = 0.1%<br>BS= 2.71g =98.8%<br>T= 0.03g = 1.1% |
| 110 h | 83h | toluene | 0.031 | 80% by vol. ethanol | 0.300 | 65 | 35–65 | NS=1.33g =98.2%<br>BS=0.02g = 1.8%<br>T=0.0g = 0.0% | 1–31 | NS=<0.01g =<0.1%<br>BS= 8.77g =99.8%<br>T= 0.01g = 0.1% |
| 110 i | 83i | xylene | 0.047 | 80% by vol. methanol | 0.500 | 55 | 29–55 | NS=2.41g =97.5%<br>BS=0.06g = 2.5%<br>T=0.00g = 0.0% | 1–27 | NS= 0.01g = 0.1%<br>BS=13.31g =98.4%<br>T= 0.20g = 1.5% |
| 110 k | 83k | methylene chloride | 0.075 | 60% by vol. methanol | 1.500 | 70 | 37–70 | NS=1.86g =95.9%<br>BS=0.08g = 4.1%<br>T=0.00g = 0.0% | 1–34 | NS= 0.01g = 0.1%<br>BS=11.18g =99.3%<br>T= 0.07g = 0.6% |
| 110 l | 83l | methylene chloride | 0.075 | 60% by vol. methanol | 1.500 | 70 | 37–70 | NS=6.12g =95.9%<br>BS=0.26g = 4.1%<br>T=0.00g = 0.0% | 1–34 | NS= 0.04g = 0.1%<br>BS=38.88g =99.9%<br>T= 0.01g = 0.1% |

Table 8a—Continued

Separation Stage B
Separation of the neutral substances from the bitter substances

| | | Solvent System | | | | No. of extraction stages[1] z = | Solvent phase recovered[2] | | Raffinate phase recovered[2] | |
| | | Hydrocarbon phase | | Alcoholic phase | | | HC*—solution content of | | Alcoholic-aqueous solution content of | |
| Ex. No. | Solution Used[4] (Ex.No.) | Composition (parts by volume) | Quantity in l. | Composition (mixture with water) | Quantity in l. | | x = | NS BS T | y = | NS BS T |
|---|---|---|---|---|---|---|---|---|---|---|
| 110 n | 83m | methylene chloride | 0.100 | 60% by vol. methanol | 2.000 | 70 | 37-70 | NS=0.33g =97.1% BS=0.01g = 2.9% T=0.00g = 0.0% | 1-34 | NS= 0.01g = 0.1% BS= 1.97g =99.9% T= 0.00g = 0.0% |

The footnotes to the Tables above, are as follows:
Footnote[1] The extraction stages are extraction stages $E_1$, $E_2$ etc. of the flow chart in FIG. 3.
Footnote[2] The values quoted relate to the solvent phase Ryz obtained in accordance with the flow chart in FIG. 3 (the values quoted for the individual Examples should be inserted for x, y and z)
HC = hydrocarbon   NS = neutral substances
BS = bitter substances   T = tannins
Footnote[3] The solution used is a solution of the ingredients of the raffinate phase mentioned in the same type and quantity of the solvent mentioned in the column headed "alcoholic phase"
Footnote[4] The solution used is a solution of the ingredients of the solvent phase mentioned in the same type and quantity of the solvent mentioned in the column headed "Hydrocarbon phase"

EXAMPLE 111

870 g of pressed hops of the "Hallertauer Mittelfruher 1970" type were divided into four batches, each of 217.7 g of hops, and extracted with a mixture comprising 4354 ml of methanol and 86 ml of n-hexane. Extraction was carried out by pumping the 4.44 liters of solvent successively from the first stage to the fourth stage on the Karussel-extraction principle, the solids content of the solvent front undergoing a continuous increase. 2.64 liters of primary extract solution containing 4.15% of water and 10.8% by weight of solids were finally obtained.

The solids were separated off from the primary extract solution. 79.06 g of 100% primary extract could be recovered from the primary extract solution by evaporating off the solvent.

EXAMPLE 112

75.0 g of the primary extract obtained in Example 111 were dissolved in methanol to which 15 ml of a hexane fraction (b.p. 67° - 69°C) had been added, and a water content of 10% by volume, based on methanol, was subsequently obtained by the addition of distilled water. 625 g (721 ml) of solution with a solids content of 12.0% by weight were obtained in this way.

216 to 232 ml/h of a hexane fraction (b.p. 67° - 69°C) were introduced into a rotatory annular clearance column, 134cm long with an internal diameter of 4 mm in the vicinity of the 100 cm long rotor, at the lower end of the rotor. The hexane fraction had been previously saturated with 90% by volume of methanol. 310 to 340 ml/h of hexane-saturated 90% by volume methanol were introduced at the upper end of the rotor. The rotor of the column was set to rotate at 430 rpm. The column itself was kept at 15°C by a thermostat.

In the first hour of the test, 224 ml of primary extract solution (23.30 g of solids) were introduced into the middle of the column. Introduction of the 12.0% primary extract solution was then continued at a rate of 124 to 128 ml/h (13.10 g/h of solids). After 1.5 hours, the extraction process in the column reached a stationary equilibrium, that is, the solids input by means of the primary extract solution and the quantities of solids flowing out of the separation zone at the ends of the column were substantially the same in total.

The result of this extraction is shown in Table 9, the effluent being collected in fractions and analyzed for its content of neutral and bitter substances and tannins.

TABLE 9

| Time/h | $V_S$ (ml) | Neutral substances solids (g) | % by weight α-acid | $V_R$ (ml) | Bitter substances and tannins solids (g) | % by weight α-acid | $V_S/V_R$ | Total solids content |
|---|---|---|---|---|---|---|---|---|
| 1.5 | 247 | 1.06 | 4.33 | 430 | 13.22 | 26.80 | 0.58 | 14.28 |
| 2.5 | 273 | 1.49 | 4.18 | 450 | 12.29 | 30.14 | 0.61 | 13.78 |
| 3.5 | 292 | 1.35 | 1.18 | 455 | 11.534 | 28.68 | 0.64 | 12.88 |
| 4.5 | 248 | 1.47 | 0 | 405 | 11.303 | 30.18 | 0.61 | 12.78 |
| | 1060 | 5.37 = 10% | 2.31 | 1740 | 48.34 = 90% | 29.00 | 0.61 | 53.72 = 100% |

It can be seen from Table 9 that, in the case of continuous extraction, the α-acid and bitter substance contents of the neutral substance fraction are negligibly low and cannot be determined by analysis after about 4 hours. Extraction was terminated after a test period of 4.5 hours.

EXAMPLE 113

1740 ml of the alcoholic-aqueous phase, which was left after extraction in Example 112 and which still contained the bitter substances and tannins, was adjusted by the addition of water to a mixing ratio of 80% by volume of methanol and 20% by volume of water.

The solution was introduced into the middle of another rotary split-tube column of the same kind as used in Example 112, at a temperature of 15°C and at a rotor speed of 650 rpm. The input in the first hour was 190 ml/h and thereafter was about 131.3 ml/h. An average of 838.8 ml/h of a mixture of 7 parts by volume of hexane and 3 parts by volume of benzene, which had been saturated with 80% by volume aqueous methanol, was delivered to the bottom of the column, whilst an average of 71 ml/h of pure methanol was delivered to the head of the column.

After about 1.5 hours, the extraction process in the column reached a stationary equilibrium.

Extraction was carried out with an average volume ratio of absorbing phase $V_S$ (hydrocarbon phase) to yielding phase $V_R$ (alcoholic-aqueous phase) of $4.37 = V_S/V_R$.

All the solutions used had passed through after a period of 3.17 hours.

The solvent was distilled off under reduced pressure at 40°C from the absorbing phase $V_S$, which contained the bitter substances, and from the yielding phase $V_R$ which contained the tannins. The quantity and composition of the resulting tannins and bitter substances is shown in the following:

a) For the absorbing phase $V_S$ (bitter-substance extract solution)

| | | |
|---|---|---|
| pure extract (100%) | 19.17 g (= 35.7% | based on solution used) |
| bitter substances | 19.17 g (= 91.5% | based on bitter-substance extract) of which |
| the α-acid component was 9.43 g(= 49.2% | | based on bitter-substance extract) |
| Neutral substances | | Traces |
| Tannins | | could not be detected | b) For the yielding phase $V_R$ (tannin extract solution)

| | | |
|---|---|---|
| pure extract (100%) | 29.17 g (=60.3% | based on solution used) |
| tannins | 27.55 g (=94.5% | based on tannin extract) |
| bitter substances | 1.62 g (=5.5 g | based on tannin extract) |

Accordingly, the following overall result was obtained for the application of the process where Examples 112 and 113 are carried out in succession:

For the neutral substance content of the neutral substance extract: contained almost completely in the extract.

For the bitter substance content of the bitter substance extract:

| | |
|---|---|
| content in the pure extract: | 19.17 g |
| content in the neutral substance extract: | 0.23 g |
| content in the tannin extract: | 1.62 g |
| total content: | 21.02 g |

In other words, about 94% of the bitter substances present in the primary extract solution remained in the bitter substance extract.

For the tannin content of the tannin extract: contained almost completely in the extract.

EXAMPLE 114

40 kg of pressed hops of the "Hallertauer Nordbrauer 1970" type were treated in four 10 kg batches with a solvent mixture consisting of 411.6 liters of methanol and 8.4 liters of n-hexane, the solvent being passed through the four vessels over a period of 7 hours. 340 liters of solution were obtained and were passed through 10 kg of fresh pressed hops in the manner described, again in four stages. Another 80 liters of fresh methanol were then pumped in. 130 liters of solution were obtained, 60 liters of solution being additionally obtained from the last vessel and 10 liters of solution from the penultimate vessel. Accordingly, the primary extract solution consisted of 200 liters of solution with a solids content of 10.83%, corresponding to 18.049 kg. The water content amounted to 3.6%.

The primary extract solution was introduced into the middle of a sieve-plate pulsation column (overall length 5 meters) with a nominal width of 50 mm and an interval between plates of 50 mm, at a rate of 7.50 l/h, corresponding to 6.25 kg/h, together with 0.55 kg/h of water. 5.20 l/h ≙ 3.50 kg/h of n-hexane were pumped into the lower inlet and 4.42 l/h ≙ 3.70 kg/h of 90% by volume methanol into the upper inlet. This corresponds to a ratio by volume of $\phi = V_S/V_R = 0.41$. The material exchange at 15°C was obtained by pulsating the contents of the column at an amplitude of 3 to 4 mm and at a frequency of 108 min$^{-1}$. 5.10 l/h ≙ 3.45 kg/h of neutral substances (= 1.6) in n-hexane solution ran off from the upper separation vessel in the stationary condition, whilst 12.55 l/h ≙ 10.55 kg/h of bitter substances and tannins were obtained from the lower separation vessel.

The bitter substances and tannins were adjusted with water to a methanol content of 80% by volume and were introduced at a rate of 13.83 l/h ≙ 11.83 kg/h into the upper third of the sieve-plate column 2 which had an overall length of 9 meters, a nominal width of 72.5 mm and an interval between plates of 100 mm. The light phase, comprising n-hexane-benzene (7 : 3 v/v), saturated with 80% by volume of methanol was introduced into the lower inlet at a rate 67.80 l/h ≙ 49.22 kg/h, whilst 5.53 l/h ≙ 4.74 kg/h of 80% by volume methanol, saturated with n-hexane/benzene (7 :3 v/v), were pumped into the upper inlet. The material exchange was produced by pulsation at an amplitude of 6 mm and at a frequency of 54 min$^{-1}$. 18.00 l/h ≙ 15.64 kg/h of tannins, dissolved in 80% by volume methanol, ran off from the lower sump section, whilst 69.17 l/h ≙ 50.15 kg/h of bitter substances, dissolved in hexane-benzene (7 : 3 v/v), left the column from the upper sump section, that is, the process was carried out with a ratio by volume of $\phi = V_S/V_R = 3.84$.

The bitter substances in n-hexane-benzene (7 : 3 v/v) were either re-extracted with 88 – 96% by volume ethanol in a third column or freed from the solvent by conventional methods as in Example 113.

The following were obtained after the solvent had been distilled off from the individual fractions:

| | | |
|---|---|---|
| Neutral-substance extract | 1.960 kg (= 10.86%, | based on solids in the primary extract) |
| made up by neutral substances | 1.825 kg (= 93.11%, | based on neutral-substance extract) |
| bitter substances | 0.135 kg (= 6.89%, | based on neutral-substance extract) |
| the bitter substances have an $\alpha$-acid content of | 0.065 kg (= 3.32%, | base on neutral-substance extract) |
| Bitter substance extract | 8.293 kg (=45.94%, | based on primary extract |
| the bitter substances contain: $\alpha$-acids | 4.432 kg (=53.44%, | based on bitter substance extract) |
| neutral substance | 0.01% | |
| tannins could not be detected | | |
| bitter substance from bitter substance extract | 8.293 kg (=96.50%, | based on total bitter substances) |
| bitter substances from neutral-substance extract | 0.135 kg | |
| bitter substances from tannin extract | 0.166 kg | |
| Total bitter substances | 8.594 kg (=47.61%, | based on primary extract) |
| $\alpha$-acids in the bitter substance extract | 4.432 kg (=97.79% | of the total $\alpha$-acids) |
| $\alpha$-acids in the neutral substance extract | 0.065 kg | |
| $\alpha$-acids in the tannin extract | 0.035 kg | |
| Total $\alpha$-acid | 4.532 kg (=25.11%, | based on primary extract) |
| Tannin extract | 7.800 kg (=43.22%, | based on primary extract) |
| tannins | 7.634 kg (=97.87%, | based on tannin extract) |
| bitter substances in the tannin extract | 0.166 kg (= 2.13%, | based on tannin extract) |
| $\alpha$-acid in these bitter substances | 0.035 kg (= 0.45%, | based on tannin extract) |

It can be seen from these data that each of the three fractions was obtained from a purity of more than 90%, as in Examples 112 and 113.

Total balance:
| | | |
|---|---|---|
| primary extract | (100%) 18.049 kg | |
| total neutral substances | (100%) 1.825 kg (=10.11%, | based on primary extract) |
| total bitter substances | (100%) 8.594 kg (=47.61%, | based on primary extract |
| total tannins | (100%) 7.654 kg (=42.41%, | based on primary extract |
| | 18.073 kg (=100.13%, based on primary extract) | |

The slight excess is attributable to small residual water contents.

EXAMPLE 115

68 liters of first wort from a commercial brewery were used for carrying out a series of brewing tests. 100 liters of wort with an extract content of 12% were obtained by dilution with 32 liters of water. Four 25 liter batches of the resulting wort were boiled under identical conditions with hops and hop extracts produced from them. These four hopped worts were then processed in the same way. They were filtered, attenuated with bottom brewer's yeast at 5° to 9°C, and the beers were stored for 4 weeks at 1°C, filtered under pressure and bottled. The particular quantity of hops and extract were selected in such a way that, with each hopping, the same quantity of total soft resins entered the wort. More particularly, the following quantities were added:
  Brew I 50 g of hops of the "Hallertauer Mittelfruher 1970" type
  Brew II 6.76 g of neutral substance extract
  Brew III 6.92 g of bitter substance extract
  Brew IV 6.92 g of bitter substance extract
    10.40 g of tannin extract The bitter substance contents of the finished beers were different as expected. Foam stability and haze stability were also different. The extract beers had a more stable foam and a somewhat lower haze stability than the hop beer. However, other important analytical data of the beers, such as degree of fermentation, extract content, alcohol content and $CO_2$-content, were largely consistent, thus ensuring their organoleptic comparability. Flavor evaluation of the beers by 6 selected tasters produced the following verdicts:

I Hop beer
  weak hop aroma
  average, slightly lingering bitterness
II Neutral-substance beer
  finely-pronounced hop aroma
  pure, very weak bitterness
III Bitter-substance beer
  no hop aroma
  sharp, non-lingering bitterness
IV Bitter-substance/tannin beer
  no hop aroma, but a pungent odor typical of beer
  very sharp, lingering bitterness.

These results show a marked difference in the beer flavor of extract beers. At the same time, it is clear that the aroma and bitterness of the beers can be influenced independently of one another, depending upon which extract is used.

It will be understood that the specification and examples are illustrative but not limitative of the present invention and that other embodiments within the spirit and scope of the invention will suggest themselves to those skilled in the art.

What is claimed is:

1. Process for substantially separating the essential ingredients of hops, which process comprises subjecting a primary extract of hops in an organic solvent, containing as components (i) neutral substances, (ii) bitter substances and (iii) tannins, to a first liquid-liquid extraction with a second organic solvent different from said primary extract solvent whereby either (iii) the tannins or (i) the neutral substances are substantially separated off, leaving a residual solution of (i and ii) neutral and bitter substances or (iii and ii) tannins and bitter substances, and subjecting the residual solution to a second liquid-liquid extraction with an organic solvent different from said second organic solvent to separate said solution into its components.

2. Process as claimed in claim 1, wherein the primary extract solution is a solution of the hops ingredients in alcohol, alcohol containing water, benzene, alkyl benzenes or halogenated hydrocarbons.

3. Process as claimed in claim 1, wherein the primary extract solution is a methanolic-aqueous or an ethanolic-aqueous solution.

4. Process as claimed in claim 3, wherein the alcoholic primary extract solution has a water content of from about 5 to 30% by volume.

5. Process as claimed in claim 1, wherein the primary extract solution is a solution of the hops ingredients in benzene.

6. Process as claimed in claim 1, wherein the primary extract solution is a solution of the hops ingredients in methylene chloride.

7. Process as claimed in claim 1, wherein the primary extract solution is subjected to the first liquid-liquid extraction in an extraction stage A, wherein the neutral and bitter substances (i and ii) are separated from the tannins (iii), and to the second liquid-liquid extraction in an extraction B, wherein the neutral substances (i) are separated from the bitter substances (ii).

8. Process as claimed in claim 7, wherein the primary extract solution is an alcoholic solution and the primary extract solution is subjected, in the extraction stage A, to extraction with a hydrocarbon extractant 1 comprising at least one of aliphatic hydrocarbons of from 5 to 10 carbon atoms, cyclo-aliphatic hydrocarbons of from 5 to 8 carbon atoms, and aromatic hydrocarbons selected from benzene and alkyl-substituted benzene derivatives, resulting in an extract of the neutral substances and bitter substances (i and ii) in a hydrocarbon phase and leaving the tannins (iii) in an alcoholic phase; subjecting the extract from said extraction stage A, containing (i and ii) in extraction stage B, to extraction with an alcohol extractant 2 comprising a mixture of at least one lower aliphatic alcohol with water, to result in an extract of the bitter substances (ii) in an alcohol/water phase and leaving the neutral substances (i) in the hydrocarbon phase.

9. Process as claimed in claim 8, wherein the alcoholic primary extract solution contains water in such amount that, in extraction stage A, the water content of the alcoholic phase amounts to between about 10 and 30% by volume and the aromatic and cycloaliphatic hydrocarbon content of extractant 1 amounts to between about 10 and 60% by volume.

10. Process as claimed in claim 8, wherein the ratio by volume of extractant 1 to the alcoholic phase is in the range of from about 1 to 10.

11. Process as claimed in claim 8, wherein the hydrocarbon phase subjected to extraction in extraction stage B has a cycloaliphatic and/or aromatic hydrocarbon content of less than about 40% by volume, while the water content of extractant 2 is from about 10 to 30 % by volume.

12. Process as claimed in claim 8, wherein the hydrocarbon phase extracted in extraction stage B contains approximately 0 to 30 % by volume of cycloaliphatic and/or aromatic hydrocarbons, and the water content of extractant 2 is from about 10 to 20 % by volume.

13. Process as claimed in claim 8, wherein the ratio by volume of said hydrocarbon phase to extractant 2 is in the range of from about 0.1 to 1.0.

14. Process as claimed in claim 8, wherein the ratio by volume of said hydrocarbon phase to the alcohol phase in extraction stage B is reduced to at least one half to one third of the corresponding ratio of hydrocarbon phase to the alcoholic phase in extraction stage A.

15. Process as claimed in claim 8 wherein in extraction stage A the extractant is at least one halogenated hydrocarbon with from 1 to 3 carbon atoms and with up to 3 halogen atoms.

16. Process as claimed in claim 7, wherein the primary extract solution is a solution of the hops ingredients in benzene, alkyl benzenes, or halogenated hydrocarbons, and the primary extract solution is subjected, in extraction stage A, to extraction with an alcoholic extractant 1 comprising at least one of aliphatic alcohols of from 1 to 3 carbon atoms, or mixtures of such alcohols with water, whereby the neutral and bitter substances (i and ii) remain in the hydrocarbon or halogenated hydrocarbon phase as a raffinate, while the tannins (iii) are extracted into the alcoholic phase as a tannin extract; and subjecting, in extraction stage B, the raffinate from extraction stage A containing neutral and bitter substances (i and ii), to extraction with an alcohol extractant 2 comprising a mixture of lower aliphatic alcohol with water, to result in an extract of the bitter substances (ii) in an alcohol/water phase and leaving the neutral substances (i) in the hydrocarbon or halogenated hydrocarbon phase.

17. Process as claimed in claim 16, wherein methanol-water mixtures containing from 10 to 40 % by volume of water are used as extractant 1 in extraction stage A.

18. Process as claimed in claim 16, wherein, in extraction stage A, the ratio by volume of the hydrocarbon phase to the alcoholic phase is in the range of from about 1 to 10.

19. Process as claimed in claim 16, wherein, in extraction stage A, the ratio by volume of the halogenated hydrocarbon phase to the alcoholic phase is in the range of from about 0.1 to 2.

20. Process as claimed in claim 16, wherein the hydrocarbon phase used in extraction stage B has an aromatic hydrocarbon content of less than about 40% by volume, and the water content of extractant 2 is from about 10 to 30 % by volume.

21. Process as claimed in claim 20, wherein the ratio by volume of the hydrocarbon phase to extractant 2 is in the range of from about 0.1 to 1.0.

22. Process as claimed in claim 16, wherein the halogenated hydrocarbon phase used in extraction stage B is methylene chloride and extractant 2 is a methanol-water mixture containing from 30 to 40% by volume of water.

23. Process as claimed in claim 22, wherein the ratio by volume of the halogenated hydrocarbon phase to extractant 2 is in the range of from about 0.05 to 0.2.

24. Process as claimed in claim 1, wherein the neutral substances (i) are separated from the bitter substances and tannins (ii and iii) in the primary extract solution in an extraction stage C, while the tannins (iii) are separated from the bitter substances (ii) in an extraction stage D.

25. Process as claimed in claim 24, wherein the primary extract solution is an alcoholic solution and the primary extract solution is subjected, in extraction stage C, to extraction with a hydrocarbon extractant 3 comprising at least one of aliphatic hydrocarbons having from 5 to 10 carbon atoms, cycloaliphatic hydrocarbons having from 5 to 8 carbon atoms, and aromatic hydrocarbons selected from benzene and alkylsubstituted benzene derivatives, to result in extraction of the neutral substances (i) into a hydrocarbon phase as a neutral substance extract, while the bitter substances and tannins (ii) and (iii) are left in an alcoholic phase; and the alcoholic phase left after extraction stage C is subjected, in extraction stage D, to extraction with a hydrocarbon extractant 4 comprising at least one of aliphatic hydrocarbons of from 5 to 8 carbon atoms, aliphatic hydrocarbons of from 5 to 10 carbon atoms, cycloaliphatic hydrocarbons of from 5 to 8 carbon atoms, and aromatic hydrocarbons selected from benzene and alkyl-substituted benzene derivatives, to result in extraction of the bitter substances (ii) into the hydrocarbon phase while the tannins (iii) are left in the alcoholic phase.

26. Process as claimed in claim 25, wherein the primary extract solution in extraction stage C has a water content of from about 5 to 30% by volume.

27. Process as claimed in claim 25, wherein the ratio by volume of extractant 3 to the alcoholic phase is in the range of from 0.1 to 1.

28. Process as claimed in claim 24, wherein the primary extract solution is a solution of the hops ingredients in benzene, alkylbenzenes or halogenated hydrocarbons and the primary extract solution is subjected to, in extraction stage C, extraction with an alcoholic extractant 3 comprising at least one of aliphatic alcohols of from 1 to 3 carbon atoms or mixtures of such alcohols with water, to result in leaving the neutral substances (i) in a hydrocarbon or halogenated hydrocarbon phase while the tannins and the bitter substances (iii and ii) are extracted into the alcoholic phase; and the alcoholic extract phase from extraction stage C containing tannins and bitter substances (iii and ii) is subjected, in extraction stage D, to extraction with a hydrocarbon extractant 4 comprising at least one of aliphatic hydrocarbons of from 5 to 10 carbon atoms, cycloaliphatic hydrocarbons having from 5 to 8 carbon atoms, and aromatic hydrocarbons selected from benzene and alkyl-substituted benzene derivatives, to result in extraction of the bitter substances (ii) into the hydrocarbon phase while the tannins (iii) remain in the alcoholic phase.

29. Process as claimed in claim 28, wherein a methanol-water mixture containing from 10 to 40% by volume of water is used as extractant 3 in extraction stage C.

30. Process as claimed in claim 28, wherein the primary extract solution is a solution containing a halogenated hydrocarbon and the ratio by volume of the halogenated hydrocarbon phase to the alcoholic phase is in the range of from 0.1 to 0.4.

31. Process as claimed in claim 28, wherein the alcoholic phase used in extraction stage D has a water content of from about 10 to 40% by volume, and the hydrocarbon phase used as extractant 4 has an aromatic hydrocarbon content of from about 0 to 90 % by volume.

32. Process as claimed in claim 28, wherein the ratio by volume of extractant 4 to the alcoholic phase is in the range of from about 1 to 10.

33. Process as claimed in claim 28, wherein the ratio by volume of the hydrocarbon phase to the alcoholic phase in extraction stage D is increased by at least about 5 to 20 times in relation to the corresponding ratio in extraction stage C.

* * * * *

UNITED STATES PATENT AND TRADEMARK OFFICE
CERTIFICATE OF CORRECTION

PATENT NO. : 3,891,781
DATED : June 24, 1975
INVENTOR(S) : Kurt Bauer

It is certified that error appears in the above-identified patent and that said Letters Patent are hereby corrected as shown below:

Column 1, line 39, cancel "not" and substitute --now--.

Column 15, line 5, before Example 8d, insert the following paragraph:

"52.794 liters of primary extract solution weighing 44.295 kg and containing 5.187 kg of hop extract, corresponding to 11.71% by weight, and 2.815 kg of water, corresponding to 6.36% by weight, were obtained from the eighth column. The 5.187 kg of hop extract corresponded to an extraction yield of 22.55% and contained 3.055 kg (58.9%) of neutral and bitter substances and 2.132 kg (41.1%) of tannins."

Column 18, Example 9, last column, cancel "0.0%" and substitute --<0.1%--.

UNITED STATES PATENT AND TRADEMARK OFFICE
CERTIFICATE OF CORRECTION

PATENT NO. : 3,891,781
DATED : June 24, 1975
INVENTOR(S) : Kurt Bauer

It is certified that error appears in the above-identified patent and that said Letters Patent are hereby corrected as shown below:

Column 20, Example 30b, last column, N, before "0.1%" insert --〈--.

Column 20, Example 30c, last column, at T, cancel "39.37%" and substitute --39.3%--.

Column 20, Example 30e, HC column, B, cancel "8%" and substitute --0.3%--.

Column 20, second Example 30f, last column, N, before "0.1%" insert-- 〈--.

Column 23, Example 54, Solution column, cancel "23" and substitute --28--.

Column 25, bottom line, before "hexane" insert in first column (Ex. No.)--66--.

Column 26, Example 58, column y=, after "1-" insert--4--.

UNITED STATES PATENT AND TRADEMARK OFFICE
CERTIFICATE OF CORRECTION

PATENT NO. : 3,891,781
DATED : June 24, 1975
INVENTOR(S) : Kurt Bauer

It is certified that error appears in the above-identified patent and that said Letters Patent are hereby corrected as shown below:

Column 27, Example 69, Alcoholic Phase Composition column, under "90% by vol." insert --ethanol--.

Column 27, bottom line, before "heptane," in Ex. No. column insert --78--.

Column 29, Example 81, under "cyclohexane" cancel "5:2" and substitute --5:5--.

Column 32, Example 84, above "B" (both columns) insert --N=9.34g=96.5%; N=0.09g=0.2%--.

Column 32, Example 85, in HC column, after "T=" insert --0--.

Column 32, Example 89, last column, B, cancel "18.7" and insert --18.74--.

Column 34, Example 98, last column, B, cancel "98%" and substitute --98.5%--.

Column 34, Example 102, X column should be 9-16.

UNITED STATES PATENT AND TRADEMARK OFFICE
CERTIFICATE OF CORRECTION

PATENT NO. : 3,891,781
DATED : June 24, 1975
INVENTOR(S) : Kurt Bauer

It is certified that error appears in the above-identified patent and that said Letters Patent are hereby corrected as shown below:

Column 34, Example 106, HC column, N, cancel "93.0" and substitute --98.0%--.

Column 34, Example 107, Solvent, quantity, cancel "0.6" and substitute --0.66--.

Column 36, last column, T, cancel "0.10g" and substitute --0.01g--.

Column 37, first column, under "110" cancel "$\underline{n}$" and substitute --$\underline{m}$--.

Signed and Sealed this

Twenty-seventh Day of July 1976

[SEAL]

Attest:

RUTH C. MASON
*Attesting Officer*

C. MARSHALL DANN
*Commissioner of Patents and Trademarks*